(12) United States Patent
Shibata

(10) Patent No.: US 9,160,588 B2
(45) Date of Patent: Oct. 13, 2015

(54) RADIO RECEIVER AND FREQUENCY CORRECTING METHOD THEREFOR

(71) Applicant: ICOM INCORPORATED, Osaka (JP)

(72) Inventor: Kazunori Shibata, Osaka (JP)

(73) Assignee: ICOM Incorporated, Osaka (JP)

( * ) Notice: Subject to any disclaimer, the term of this patent is extended or adjusted under 35 U.S.C. 154(b) by 0 days.

(21) Appl. No.: 14/608,619

(22) Filed: Jan. 29, 2015

(65) Prior Publication Data

US 2015/0215142 A1    Jul. 30, 2015

(30) Foreign Application Priority Data

Jan. 29, 2014 (JP) ................... 2014-014780

(51) Int. Cl.

| H04L 27/14 | (2006.01) |
|---|---|
| H04L 7/04 | (2006.01) |
| H04L 27/22 | (2006.01) |
| H04W 4/10 | (2009.01) |
| H04L 25/06 | (2006.01) |
| H04B 1/30 | (2006.01) |
| H04W 56/00 | (2009.01) |
| H04L 27/26 | (2006.01) |

(52) U.S. Cl.
CPC .............. *H04L 27/142* (2013.01); *H04L 7/04* (2013.01); *H04L 25/061* (2013.01); *H04L 27/22* (2013.01); *H04L 27/2659* (2013.01); *H04W 4/10* (2013.01); *H04B 2001/305* (2013.01); *H04L 27/266* (2013.01); *H04W 56/0035* (2013.01)

(58) Field of Classification Search
CPC .... H04B 15/00; H04B 1/16; H04B 2001/305; H04L 27/2659; H04L 27/266; H04L 25/06; H04L 25/061; H04L 27/14; H04L 27/142; H04W 56/0035

See application file for complete search history.

(56) References Cited

U.S. PATENT DOCUMENTS

| 6,366,622 | B1 * | 4/2002 | Brown et al. ................. 375/322 |
|---|---|---|---|
| 7,593,485 | B2 * | 9/2009 | Wong et al. .................. 375/319 |
| 7,817,979 | B2 * | 10/2010 | Clark et al. ................... 455/311 |
| 8,831,144 | B2 | 9/2014 | Shibata |
| 2005/0197064 | A1 * | 9/2005 | Ibrahim et al. ............... 455/41.2 |
| 2006/0269003 | A1 * | 11/2006 | Hammerschmidt et al. .. 375/260 |
| 2007/0047737 | A1 * | 3/2007 | Lerner et al. .................... 381/22 |
| 2007/0297536 | A1 * | 12/2007 | Yui et al. ....................... 375/319 |
| 2008/0018508 | A1 * | 1/2008 | Filipovic et al. .............. 341/118 |

FOREIGN PATENT DOCUMENTS

| JP | 4835172 | 12/2011 |
|---|---|---|
| JP | 5304089 | 10/2013 |

* cited by examiner

*Primary Examiner* — Jean B Corrielus
(74) *Attorney, Agent, or Firm* — Wenderoth, Lind & Ponack, L.L.P.

(57) ABSTRACT

Provided is a radio receiver using a modulation scheme such as FSK or QPSK in which a transmission and reception frequency shift appears as DC offset in a demodulated signal, capable of increasing noise immunity while suppressing deterioration in sensitivity. A high-speed pull-in processing unit 102 that performs offset correction by subtracting a correction value Adj_DC obtained from transmission and reception frequency deviation from the demodulated (detected) signal and a low-speed pull-in processing unit 104 that feedbacks a correction value Adj_local(t) obtained from an average value of the demodulated (detected) signal to a local oscillator 1012 are used in combination. The correction value Adj_DC for the high-speed pull-in processing is reduced over time by subtracting a correction amount Adj_Del(t) from the correction value Adj_DC and the feedback is performed, so that, as a result, the correction value Adj_DC for the high-speed pull-in processing is given to the low-speed pull-in processing. Accordingly, it is possible to increase noise immunity while suppressing deterioration in sensitivity in which the received signal is cut by a band-limiting filter.

6 Claims, 18 Drawing Sheets

RADIO RECEIVER AND FREQUENCY CORRECTING METHOD THEREFOR

CROSS-REFERENCE TO RELATED APPLICATION

This application is based on Japanese patent application serial No. 2014-014780, filed in Japanese Patent Office on Jan. 29, 2014, the contents of which are hereby incorporated by reference.

BACKGROUND OF THE INVENTION

1. Field of the Invention

The present invention relates to a radio receiver used in a radio system for non-continuous transmission and a frequency correcting method therefor. The invention particularly relates to a technique used for a modulation scheme such as the frequency shift keying (FSK) modulation scheme or the phase shift keying (PSK) modulation scheme using delay detection in which transmission and reception frequency deviation appears as DC offset in a demodulated (detected) signal, the technique being for removing the DC offset superimposed on the demodulated signal.

2. Description of the Related Art

In radio receivers used in a radio system for non-continuous transmission, when accepting a call, the call acceptance rate may be lowered unless transmission and reception frequency deviation, caused by the reception frequency of the receiving station being shifted from the transmission frequency of a radio transmitter, is promptly detected and corrected.

In particular, in a communication system that often repeats voice communication using the push-to-talk system in which one station performs transmission while another station is performing reception using the same frequency, such as land mobile radio (LMR) devices, unless the voice data is detected and demodulated while accordingly correcting the frequency deviation promptly to extract accurate symbols, a break in the start of speech occurs in which a first portion of the call is lost, and a proper call cannot be made.

For example, in the case of a receiver such as a 400-MHz digital radio using the FSK modulation scheme or the PSK modulation scheme, the demodulation (detection) is performed using differential detection through frequency-voltage conversion. Thus, the demodulated signal that is output is a voltage at a multi-valued (e.g., two-valued or four-valued) level corresponding to a frequency, and the frequency deviation appears as DC offset superimposed on the demodulated signal.

Conventionally, in order to remove the frequency deviation, two techniques, namely high-speed pull-in processing and low-speed pull-in processing have been mainly used.

The high-speed pull-in processing is a technique that subtracts, from a received and demodulated signal, the DC offset obtained from a difference between a DC value of a predetermined number of symbol patterns of the demodulated signal and a known DC value of symbol patterns of a synchronization signal. FIGS. 17A to 17C schematically show the processing.

FIG. 17A shows an original demodulated signal, wherein one call is configured by a plurality of frames each having a predetermined length, and each frame is schematically configured including the synchronization signal including a synchronization word and a preamble, and voice or non-voice data.

In the high-speed pull-in processing, a DC value (DC offset) shown in FIG. 17B is obtained corresponding to the frequency deviation $\Delta f$ of the demodulated signal, from the portion of the synchronization signal, and the DC value is taken as a correction value, which is to be subtracted from the demodulated signal. Thus, as shown in FIG. 17C, symbols are promptly extracted and the data is demodulated from the first data.

However, according to the high-speed pull-in processing, the reliability of the obtained DC value is low in a noise environment, and, if erroneous correction is performed as it is, bit error may be likely to occur when recovering symbol data.

Furthermore, even when there is frequency deviation, only the DC offset is subtracted from the demodulated signal, and the oscillation frequency of the local oscillator is not corrected. Thus, as shown in FIG. 18, the received signal may be partially lost by a band-limiting band-pass filter at the intermediate-frequency stage.

Accordingly, as shown in FIG. 19, the demodulated signal is distorted, and the reliability of the obtained DC value is lowered, and, thus, the level of precision in establishing the frame synchronization (call acceptance rate) is lowered.

FIG. 18 is a graph showing frequency characteristics of a signal in which a high-frequency signal is subjected to frequency conversion, is retrieved by a digital signal processor for demodulation, is subjected further to orthogonal demodulation and low-frequency conversion, and is about to be subjected to demodulation (symbol recovery), and a band-pass filter.

If there is no frequency deviation ($\Delta f=0$), the signal is within the pass bandwidth (12 kHz) of the band-pass filter, but, if there is frequency deviation ($\Delta f=500$ Hz toward the high-frequency side in FIG. 18), the signal (the high-frequency side) is partially cut by the band-pass filter and lost. Note that the entire receiver and the demodulator circuit will be described in detail in the embodiment below.

Thus, in consideration of the influence of noise, the correction value obtained from the portion of the synchronization signal including the preamble and the synchronization word is used in a divided manner a plurality of times. FIGS. 20A to 20C schematically show the processing.

As in FIGS. 17A to 17C, FIG. 20A shows an original demodulated signal, FIG. 20B shows a correction value, and FIG. 20C shows a corrected demodulated signal. In FIGS. 20A to 20C, the correction is performed on each frame by ¼ the initially obtained correction value. Accordingly, even in a noise environment, excessive correction may be unlikely to be performed, but a plurality of frames are required before the data is accurately demodulated.

On the other hand, the low-speed pull-in processing is a technique that obtains a DC value, that is, the DC offset from a moving average of the demodulated signal, a moving average of a midpoint of a maximum value and a minimum value of the amplitude of the demodulated signal, or the like, and corrects an oscillation frequency of a local oscillator. FIGS. 21A to 21C schematically show the processing.

As in FIGS. 17A to 17C and 20A to 20C, FIG. 21A shows an original demodulated signal, FIG. 21B shows a correction value, and FIG. 21C shows a corrected demodulated signal.

In FIGS. 21A to 21C, an inaccurate correction value obtained from the portion including the previous preamble and the previous synchronization word is set for data of the first frame, but, as reception of data and reception of the following frames are continued, the correction value is gradually corrected to a proper value due to the moving average. In the second frame, part of the data is erroneous, but the data can be demodulated, and, in the third frame, all data can be accurately demodulated.

According to the low-speed pull-in processing, even in a noise environment, proper correction can be performed, and the occurrence of distortion can be reduced. However, a plurality of frames are required before the data is acquired. Thus, the response is delayed, and the break in the start of speech may possibly occur.

Patent Document 1 (Japanese Patent No. 4835172) has proposed a radio communication device that performs high-speed pull-in processing by obtaining DC offset from a synchronization signal and subtracting it from a demodulated signal, and, as described in paragraph [0025] of this document, when synchronization is established, determines a data bit start position and switches the processing to low-speed pull-in processing for changing an oscillation frequency of a local oscillator according to the DC offset, from that start position (from the data bit of the next frame in the example in FIG. 2 of this document). With this device, as described in paragraph [0026] of this document, the switching of processing at the time when an oscillation frequency of a local oscillator should not be changed, like during data demodulation, is prevented, a deterioration in the response properties such as the break in the start of speech is suppressed, and prompt synchronization establishment and data demodulation are realized.

In Patent Document 1, the DC offset obtained only from the first synchronization signal, used in the high-speed pull-in processing, is used as it is also in the low-speed pull-in processing where the oscillation frequency of the local oscillator is corrected. Accordingly, if the DC offset is large, the oscillation frequency is significantly changed, and, thus, the processing is switched to the low-speed pull-in processing at a time that is not during data demodulation, as described above.

Accordingly, until the processing is switched to the low-speed pull-in processing, the oscillation frequency of the local oscillator is left shifted, and, thus, the received signal is partially lost by a filter and the sensitivity deteriorates as shown in FIG. 18.

In particular, in the case of a weak signal, erroneous operation is caused by noise as described in paragraph [0031] of this document. That is to say, in the case of a weak signal, if noise is superimposed on the synchronization signal, the reliability of the obtained DC offset value is lowered. Thus, the oscillation frequency of the local oscillator is sequentially corrected according to a value obtained by averaging the DC offset for several frames (four frames in FIG. 5).

However, in this low-speed pull-in processing, the DC offset obtained only from the first synchronization signal, used in the high-speed pull-in processing, is used as it is, and, thus, if there is an influence of noise, several frames are required before the average value is obtained in order to eliminate that influence. That is to say, this technique is not significantly different from the case of using only the low-speed pull-in processing. The low-speed pull-in processing obtains an average value from all symbols, and, thus, variations occur depending on data at the beginning of the low-speed pull-in processing, and the level of precision is poor.

BRIEF SUMMARY OF THE INVENTION

It is an object of the present invention to provide a radio receiver and a frequency correcting method therefor, capable of increasing noise immunity while suppressing deterioration in sensitivity at the time of reception.

In order to achieve the object, the present invention is directed to a radio receiver using a modulation scheme such as FSK or QPSK in which a frequency shift from a radio transmitter appears as DC offset in a demodulated signal, and a frequency correcting method therefor, wherein, in combined use of high-speed pull-in processing that subtracts the DC offset as it is from the demodulated signal and low-speed pull-in processing that obtains the DC offset from an average value of the demodulated signal and corrects an oscillation frequency of a local oscillator, the high-speed pull-in processing by a first correcting unit is performed first, so that voice/non-voice data and the like can be demodulated from the first frame of a call, a break in the start of speech and the like do not occur, and the level of precision in establishing the frame synchronization (call acceptance rate) can be improved.

Furthermore, the first correcting unit gradually reduces over time the DC offset value that is to be subtracted from the demodulated signal in the high-speed pull-in processing, thereby gradually reducing the influence of the high-speed pull-in processing acting on the low-speed pull-in processing by a second correcting unit, and, finally, the local oscillation frequency is accurately corrected only based on the average value of the demodulated signal by the low-speed pull-in processing.

In this manner, it is possible to increase noise immunity, and to prevent the received signal from being partially lost by a band-limiting band-pass filter (prevent the sensitivity from deteriorating).

These and other objects, features and advantages of the present invention will become more apparent upon reading of the following detailed description along with the accompanied drawings.

DETAILED DESCRIPTION OF THE INVENTION

Hereinafter, a radio receiver according to one embodiment of the present invention will be described with reference to the drawings.

Figure 1:
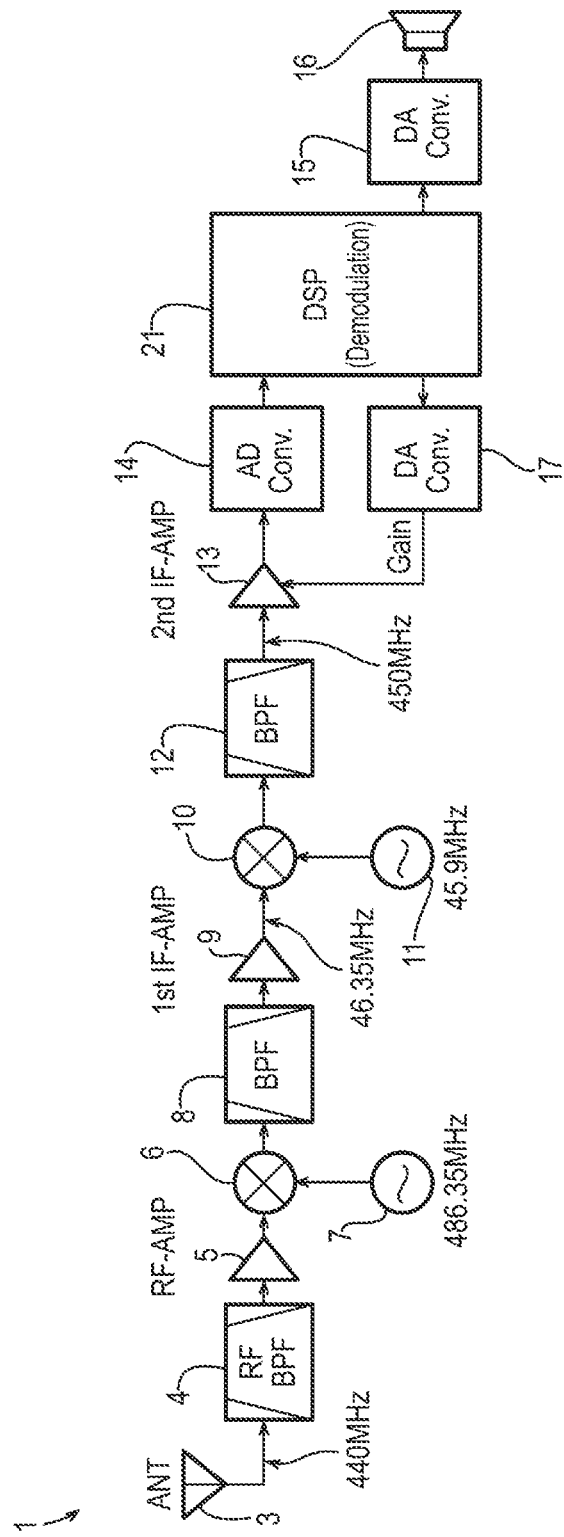
FIG. 1 is a block diagram showing the electrical configuration of a radio receiver according to one embodiment of the present invention.

FIG. 1 is a block diagram showing the electrical configuration of a radio receiver according to this embodiment of the present invention. At the block diagram in FIG. 1, a radio receiver 1 can be used both in an FSK modulation scheme and a PSK modulation scheme, but, in this example, a description will be given assuming that this receiver is used in a preferable π/4 shift (hereinafter, referred to as π/4D) QPSK modulation scheme. In the description below, constituent elements from an antenna 3 to a high-frequency circuit and an intermediate-frequency circuit form one group, but a plurality of such groups may be provided so that spatial diversity reception is performed.

The radio receiver 1 is configured following a double super-heterodyne system. A signal received by the antenna 3 is filtered by a band-pass filter 4 to extract a π/4DQPSK high-frequency signal component, for example, at 440 MHz, and the extracted component is amplified by an amplifier 5 and is then input to a first mixer 6.

The high-frequency signal from the amplifier 5 is mixed by the mixer 6 with an oscillation signal, for example, at 486.35 MHz from a local oscillator 7.

An intermediate-frequency signal (first intermediate-frequency signal), for example, at 46.35 MHz obtained by the mixer 6 in this manner is filtered by a band-pass filter 8 to extract an intermediate-frequency component thereof, and the extracted component is amplified by an amplifier 9 and is then input to a second mixer 10.

The intermediate-frequency signal is mixed by the mixer 10 with an oscillation signal, for example, at 45.9 MHz from a local oscillator 11. An intermediate-frequency signal (second intermediate-frequency signal), for example, at 450 kHz obtained by the mixer 10 in this manner is filtered by a band-pass filter 12 to extract an intermediate-frequency component thereof, and the extracted component is amplified by an amplifier (intermediate-frequency amplifier) 13 and is then input to an analog/digital converter 14.

The input signal is down-sampled, for example, at 30 kHz, and is converted into a digital value at a rate of 96 ksps (sample per second) by the analog/digital converter 14. The obtained signal is input to a demodulator circuit 21.

The demodulator circuit 21 is configured by a digital signal processor (DSP) or the like. An audio signal is demodulated by the demodulator circuit 21, is converted into an analog signal by a digital/analog converter 15, and is output as sound from a loudspeaker 16. Also, data corresponding to the input signal level is output from the demodulator circuit 21 to a digital/analog converter 17, is converted into an analog signal, and is used for gain control of the RF amplifier 5 and the intermediate-frequency amplifiers 9 and 13.

Figure 2:
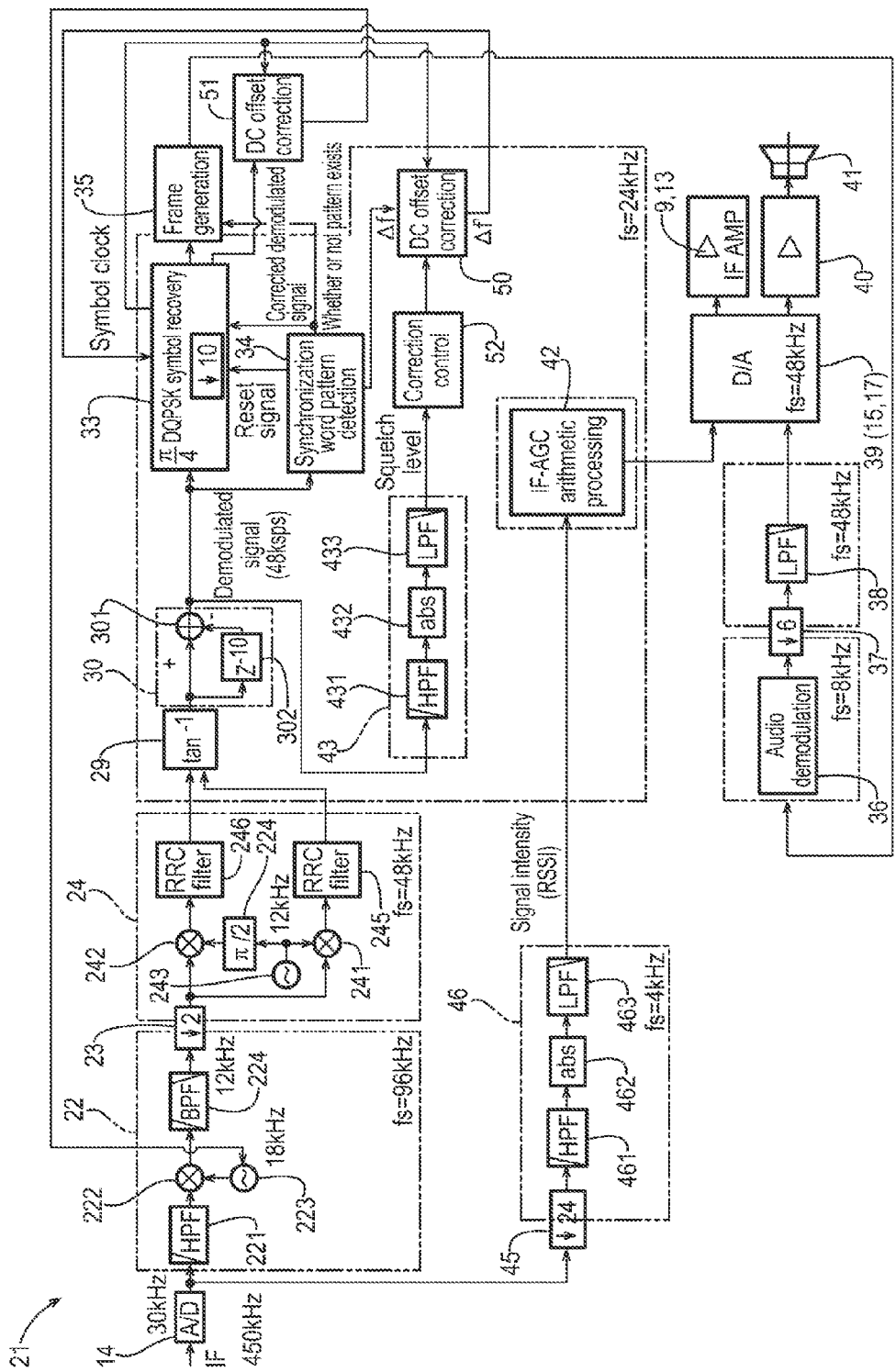
FIG. 2 is a block diagram showing one exemplary configuration of a demodulator circuit in the radio receiver.

FIG. 2 is a block diagram showing one exemplary configuration of the demodulator circuit 21. A signal from the analog/digital converter 14 is input to a frequency converter 22 in which the signal is first filtered by a high-pass filter 221 to extract a high-frequency component thereof. The signal extracted by filtering is mixed by a mixer 222 with an oscillation signal, for example, at 18 kHz and a rate of 96 ksps from a local oscillator 223.

The signal at 12 kHz and 96 ksps obtained by the mixer 222 in this manner is filtered by a band-pass filter 224 to extract a signal component thereof, and the extracted component is decimated to ½, that is, down-sampled at a ½ frequency (48 kHz) by a converter 23, and is input to an orthogonal converter 24.

The converter 23 is provided in order to reduce the processing by the orthogonal converter 24, and may be omitted if the orthogonal converter 24 is sufficient to perform the processing.

The signal input to the orthogonal converter 24 is divided into two portions that are respectively input to mixers 241 and 242. The input signal is mixed by the mixer 241 with an oscillation signal, for example, at 12 kHz and 48 ksps from a local oscillator 243. The input signal is mixed by the mixer 242 with an oscillation signal from the local oscillator 243, whose phase has been shifted by a phase shifter 244 by 90°.

In this manner, orthogonally converted I component and Q component signals at 48 ksps are respectively obtained from the mixers 241 and 242. The I component and Q component signals are output respectively via root-raised-cosine (RRC) filters 245 and 246 and are input to a phase detector 29.

The phase detector 29 calculates $\theta = \tan^{-1}(Q/I)$ using the I and Q components, assuming that $I = \cos\theta$ and $Q = \sin\theta$, thereby obtaining the phase of the signal. The phase of a sample located a predetermined number of samples prior to the current one, delayed by a delay circuit 302, is subtracted from the obtained phase at an adder 301 of a frequency detector 30. In this manner, the phase difference amount, which is a phase differential amount, is obtained by the adder 301.

Since the transmission baud rates are different and, in the case of the QPSK modulation scheme, a phase difference from a value with a minus symbol is obtained, the predetermined number of samples refer to ten samples in the QPSK modulation scheme, and refer to one sample in the FSK modulation scheme.

In this manner, the phase detector 29 and the frequency detector 30 form a detection circuit that performs differential detection and outputs a demodulated signal over-sampled at a sampling rate (48 kHz) that is ten times the symbol rate (4.8 kHz). The demodulated signal is input to a π/4DQPSK symbol recovery circuit 33 and a synchronization word pattern detection circuit 34.

The π/4DQPSK symbol recovery circuit 33 demodulates the π/4DQPSK symbol data from the amplitude value (phase difference) of the demodulated signal.

In the demodulation, the π/4DQPSK symbol recovery circuit 33 generates a symbol clock inside the circuit as described later, and retrieves the amplitude value (phase difference) and performs mapping determination at the timing of the symbol clock at 4.8 kHz, thereby determining a symbol value that corresponds to the amplitude value (phase difference) from among "00", "01", "10", and "11" in the π/4DQPSK, and recovering the symbol data.

A reset signal is input from a synchronization word pattern detection circuit 34 to the π/4DQPSK symbol recovery circuit 33 when detecting a synchronization word pattern as described later, and the timing of the internal symbol clock is adjusted.

One symbol data set demodulated by the π/4DQPSK symbol recovery circuit 33 can have four values, and, thus, it is represented by two bits, and is output as a signal at a symbol rate of 4.8 ksps to a frame generation circuit 35.

If a synchronization word pattern is detected by the synchronization word pattern detection circuit 34, that is, reception is properly performed as described later, the symbol data is constructed into a predetermined frame by the frame generation circuit 35 and is output to an audio demodulation unit 36.

The correction of the symbol clock by the synchronization word pattern detection circuit 34 and the recovery of the symbol data by the π/4DQPSK symbol recovery circuit 33 will be described later in detail.

The synchronization word pattern detection circuit 34 is for detecting a synchronization signal in the claims, including a synchronization word and a preamble or the like following synchronization word. In this embodiment, the synchronization signal in the claims is referred to as a synchronization word.

The symbol data obtained by the frame generation circuit 35 is four-valued data with a sample frequency of 4.8 kHz. The compressed signal is expanded by the audio demodulation unit 36 from that data using a predetermined audio codec circuit, so that the signal is demodulated into a 16-bit PCM audio signal at 8 kHz.

The PCM audio signal is over-sampled by a converter 37 at a frequency (48 kHz) that is six times 8 kHz, and is filtered by a low-pass filter 38, after which the extracted component is input to a digital/analog converter 39 (15) so as to be demodulated into an analog audio signal, is amplified by an amplifier 40, and is then output as sound from a loudspeaker 41.

Meanwhile, the converted data from the analog/digital converter 14 is down-sampled by a converter 45 at a 1/24 frequency (4 kHz), and is input to an RSSI circuit 46.

In the RSSI circuit 46, the data is filtered by a high-pass filter 461 to remove a DC component mixed in at the analog/digital converter 14, and the absolute value of the extracted component is obtained by an absolute value circuit 462, and is then evened out by a low-pass filter 463, so that the RSSI level is obtained. The obtained RSSI level is given to an unshown indicator and the like, and is input to an AGC arithmetic circuit 42.

The AGC arithmetic circuit 42 calculates an IF gain based on the RSSI level. The gain data is converted by the digital/analog converter 39 (17) into an analog signal, and is used for gain control of the RF amplifier 5 and the intermediate-frequency amplifiers 9 and 13.

The data of the phase difference amount from the adder 301 is given to a squelch circuit 43 in which the data is filtered by a high-pass filter 431 to extract a noise component thereof, and the absolute value of the noise is obtained by an absolute value circuit 432, and is then evened out by a low-pass filter 433, so that the squelch level is obtained.

If the squelch level (noise level) is larger than a predetermined threshold, a correction control circuit 52 prohibits high-speed pull-in processing by a DC offset correction circuit 50 (described later). Accordingly, erroneous correction due to noise is prevented.

The features of the thus configured radio receiver 1 will be described below. First, the synchronization word pattern detection circuit 34 obtains frequency deviation information (DC offset) Δf, and the DC offset correction circuit 50 reduces the value of the frequency deviation information (DC offset) M over time.

Next, the π/4DQPSK symbol recovery circuit 33 performs high-speed pull-in processing that performs offset correction of the demodulated symbol data, using the reduced frequency deviation information (DC offset) Δf'.

When performing low-speed pull-in processing that changes the local oscillation frequency of the local oscillator 223 or 243 (223 in the example in FIG. 2) using the average value of the demodulated (detected) signal, the DC offset correction circuit 51 performs low-speed pull-in processing using the average value of the demodulated (detected) signal subjected to offset correction using the frequency deviation information (DC offset) Δf' from the π/4DQPSK symbol recovery circuit 33.

In this manner, in combined use of the high-speed pull-in processing and the low-speed pull-in processing, the influence of the high-speed pull-in processing acting on the offset correction is gradually reduced, and, finally, only the low-speed pull-in processing is performed. The radio receiver 1 is characterized in this aspect.

Accordingly, the synchronization word pattern detection circuit 34 and the DC offset correction circuit 50 first perform an offset calculating step. The DC offset correction circuit 50 and the π/4DQPSK symbol recovery circuit 33 form a first correcting unit.

The DC offset correction circuit 51 performs a second offset calculating step. The DC offset correction circuit 51 and the local oscillator 223 or 243 (223 in the example in FIG. 2) form a second correcting unit. Hereinafter, offset correction according to the present invention will be described in detail.

Figure 3:
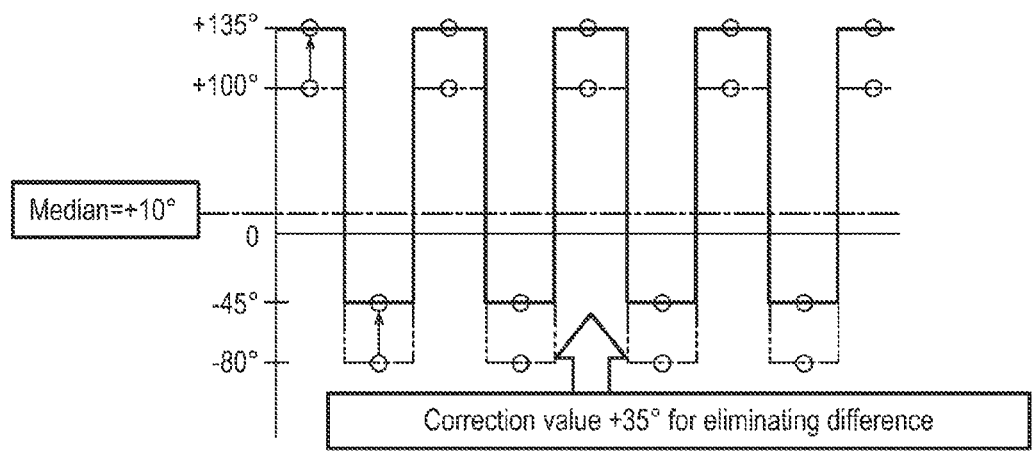
FIG. 3 is a waveform diagram showing how the correction is performed by high-speed pull-in processing of the radio receiver.

FIG. 3 is a waveform diagram showing how the correction is performed by high-speed pull-in processing. Data in the waveform as shown in FIG. 3 is output from the frequency detector 30 as the demodulated signal in a state of being over-sampled (48 ksps) at 48 kHz that is ten times the symbol rate (4.8 kHz). When the data is sampled at a symbol rate of 4.8 kHz by the π/4DQPSK symbol recovery circuit 33, sample values (phases) indicated, for example, by circles in FIG. 3 are obtained.

Figure 5:
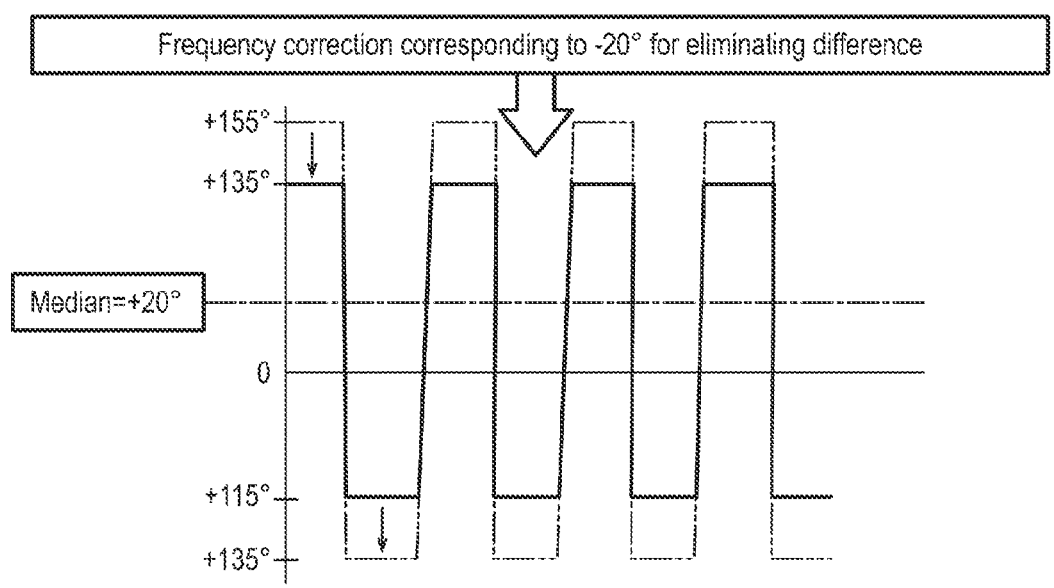
FIG. 5 is a waveform diagram showing how the correction is performed by low-speed pull-in processing of the radio receiver.

In FIG. 3 and FIG. 5, which will be described later, the scale is shown as a signal phase, but what is actually output from the frequency detector 30 is a DC waveform as shown in FIG. 3. For facilitating the understanding of the description, the DC value is shown as a phase in π/4DQPSK.

First, the high-speed pull-in processing is for improving the call acceptance rate using synchronization signals, and for improving the forward error correction (FEC) in frames, and is performed only during out-of-synchronization, that is, only in a first frame of a call.

Figure 4A:
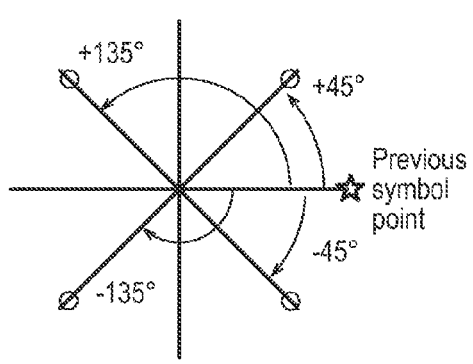
FIGS. 4A and 4B are graphs illustrating the π/4DQPSK modulation scheme.
Figure 4B:
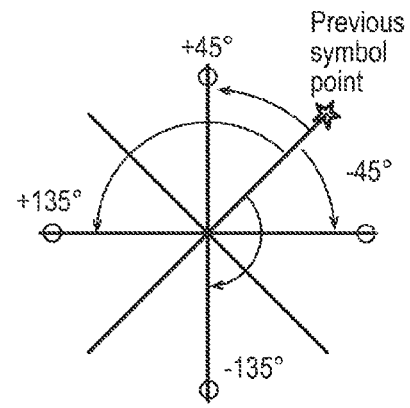

As shown in Table 1, digital data obtained from a symbol value in π/4DQPSK can have four values consisting of "00", "01", "10", and "11", and the symbol value is expressed as a change (phase difference) from a previous symbol determination point. For example, if the previous symbol determination point is 0° position, the symbol position of each value is as shown in FIG. 4A, and, if the previous symbol determination point is 45° position, the symbol position of each value is as shown in FIG. 4B.

TABLE 1

| Phase difference | Angle (rad) | Digital data |
| --- | --- | --- |
| +45° | +π/4 | 00 |
| +135° | +3π/4 | 01 |
| −45° | −π/4 | 10 |
| −135° | −3π/4 | 11 |

The high-speed pull-in processing is a technique that, in a first frame of a call, detects the synchronization word in which predetermined symbol patterns are continuously arranged in the frame head portion, obtains the DC offset (reception frequency deviation) from a difference between the DC value (symbol signal value) of the demodulated signal in the synchronization word portion and the known DC value of the symbol data in the synchronization word portion, and subtracts the DC offset from the symbol signal value, thereby performing the correction.

The synchronization word repeats a prescribed pattern between +135° and −45° as indicated by the solid line in FIG. 3. Thus, in this embodiment, the π/4DQPSK symbol recovery circuit 33 obtains a difference between the synchronization word and the prescribed pattern as described later, and determines that the synchronization word has been detected when the difference becomes smallest, thereby obtaining the DC offset.

Specifically, the π/4DQPSK symbol recovery circuit 33 obtains an average value of a predetermined number of symbol values in the synchronization word. When there is no reception frequency deviation in which a receive-side carrier frequency F0 matches a transmission-side carrier frequency f0 (f0−F0'=Δf=0), the symbol value in the synchronization word alternates between +135° and −45°, and the average value (midpoint) is +45°. The shift amount from +45° is the DC offset (reception frequency deviation Δf).

In the example in FIG. 3, the signal with shift indicated by the broken line alternates between +100° and −80°, and the average value (midpoint) is +10°. Thus, the correction is performed by +45°−(+10°)=+35° for correcting the shift.

Meanwhile, FIG. 5 is a waveform diagram showing how the correction is performed by low-speed pull-in processing. The low-speed pull-in processing is a technique that, regardless of whether or not there is frame synchronization, obtains reception frequency deviation from an average value (DC value) of all symbols in a predetermined period (a predetermined number of symbols), and controls the oscillation frequency of one of the local oscillators 223 and 243 (the first local oscillator 223 in FIG. 2). Accordingly, even when the reception frequency deviation is approximately ±200 Hz, the DC offset correction circuit 50 can shift the received signal to the center frequency of the band-pass filter 224.

Thus, the local oscillator 223 (or 243) is configured by a digital VCO, and the DC offset correction circuit 50 changes the timing for the local oscillator 223 (or 243) to read waveform (representing an amplitude level) data from a sin table that the oscillation waveform is based on, thereby changing the oscillation frequency. The reading timing is changed to the timing corresponding to an oscillation frequency that is higher or lower than the current oscillation frequency by a predetermined frequency.

With such a correcting operation, the symbol value indicated by the broken line in FIG. 5 is shifted to the solid line, and the level of precision in determination in the π/4DQPSK symbol recovery circuit 33 is improved.

Specifically, the example in FIG. 5 shows a waveform in which the data regularly alternates between a maximum amplitude of +135° and a minimum amplitude of −135°. When there is no reception frequency deviation as indicated by the solid line, the average value of the maximum amplitude of +135° and the minimum amplitude of −135° is 0°. The shift amount from 0° is the DC offset (reception frequency deviation).

For example, it is assumed that the state with shift is such that the maximum amplitude is +155° and the minimum amplitude is −115° indicated by the broken line. Accordingly, the average value is +20°, and the correction is performed by 0°−(+20°)=−20° for correcting the shift.

The frequency converter 22 is provided in order to reduce the processing in subsequent steps, and may be omitted. In this case, the local oscillator 223 outputs an oscillation signal at 30 kHz and 96 ksps, and the low-speed pull-in processing (DC offset correction using frequency deviation) is performed by controlling the oscillation frequency of the local oscillator 243.

Hereinafter, prior to a description of the DC offset correction operation by the π/4DQPSK symbol recovery circuit 33 and the DC offset correction circuit 50 and the symbol recovery operation by the π/4DQPSK symbol recovery circuit 33 using a symbol value subjected to the offset correction, a detecting operation of a synchronization word pattern by the synchronization word pattern detection circuit 34, which is a frame synchronization detection circuit, will be described with reference to FIG. 6.

Figure 6:
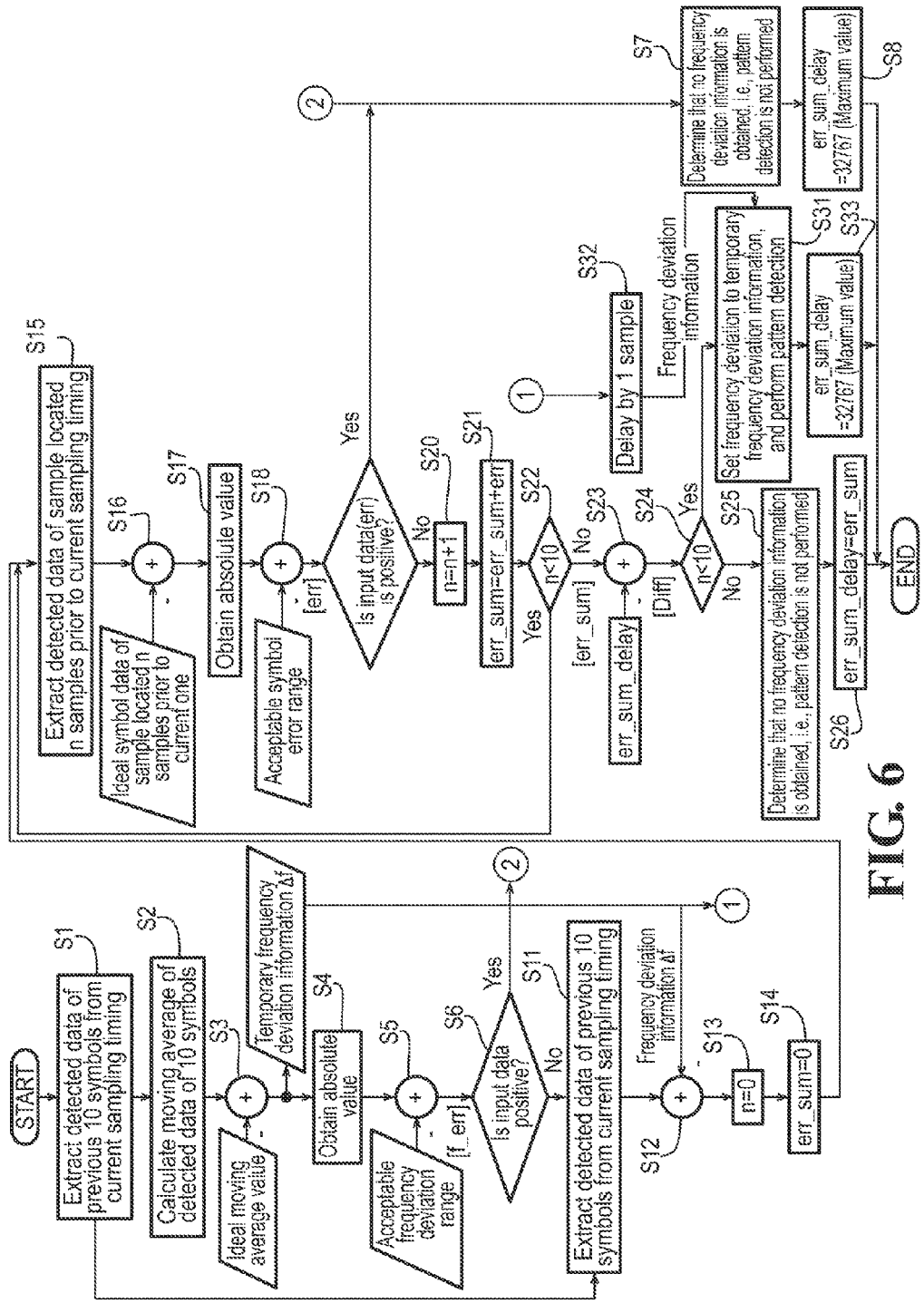
FIG. 6 is a flowchart illustrating an operation of a synchronization word pattern detection circuit in the radio receiver.

FIG. 6 is a flowchart illustrating an operation of the synchronization word pattern detection circuit 34. The π/4DQPSK demodulated signal input in the DC waveform as shown in FIGS. 3 and 5 from the frequency detector 30 is over-sampled by the synchronization word pattern detection circuit 34 for the predetermined period (e.g., period corresponding to ten symbols) at a predetermined number (e.g., ten times), and the over-sample value is stored.

In step S1, a demodulated signal (detected data sets) corresponding to the previous ten symbols is extracted using, as a reference, the current over-sample symbol value. That is to say, in the above-described example, not data sets of successive ten samples, but data sets at the same timing in ten data sets in each symbol period are extracted from among the data sets of 10 samples×10 times=100 samples.

In step S2, a moving average of the extracted data sets is obtained. In step S3, the known ideal moving average value of the synchronization word is subtracted therefrom, so that a temporary frequency deviation information Δf, that is, a DC offset is obtained.

In step S4, the absolute value of the temporary frequency deviation information Δf is obtained. In step S5, an acceptable frequency deviation range (200 Hz as described above) is subtracted therefrom, so that a frequency error f_err is obtained.

In step S6, it is determined whether or not the frequency error f_err is positive, that is, whether or not the temporary frequency deviation information Δf is out of the acceptable range.

In step S6, if the temporary frequency deviation information Δf is out of the acceptable range, the procedure advances to step S7 where it is determined that pattern detection of the synchronization word pattern has not been performed, that is, no frequency deviation information Δf is obtained.

In step S8, err_sum_delay representing the error accumulated value at a sample located one sample prior to the current one (described later) is set to a maximum value of 32767 ($=2^{15}-1$), and the procedure is ended.

On the other hand, in step S6, if the temporary frequency deviation information Δf is within the acceptable range, the procedure advances to step S11 where the demodulated signal (detected data sets) corresponding to the previous ten symbols obtained in step S1 is extracted. In step S12, the temporary frequency deviation information Δf is subtracted from each of the data sets, so that offset correction is performed.

In step S13, a variable n representing the symbol sampling timing is reset to 0. In step S14, err_sum representing the current error accumulated value (described later) is reset to 0.

In step S15, a demodulated signal (detected data set) of a sample located n samples prior to the current sampling timing is extracted. In step S16, the known ideal symbol data of a sample located n samples prior to the current one is subtracted from that data.

In step S17, the absolute value of the subtracted value in step S16 is obtained. In step S18, the acceptable symbol error range is subtracted from that absolute value, so that symbol error err is obtained.

In step S19, it is determined whether or not the symbol error err is positive, that is, whether or not the error err from the ideal value of the symbol data of the sample located n samples prior to the current one is out of the acceptable range.

In step S19, if the symbol data error is out of the acceptable range, the procedure advances to step S7 where it is determined that pattern detection has not been performed, that is, no frequency deviation information Δf is obtained.

On the other hand, in step S19, if the symbol data error err is within the acceptable range, the procedure advances to step S20 where the variable n is incremented by 1 and is updated. In step S21, the error accumulated value err_sum is increased by the error err and is updated.

In step S22, it is determined whether or not the variable n has reached 10, and, if not, the procedure returns to step S15.

In this manner, the error accumulated value err_sum from the ideal pattern of the symbol data sets corresponding to the previous ten symbols is obtained using, as a reference, the current over-sample symbol data.

In step S23, difference Diff between the obtained error accumulated value err_sum and the error accumulated value err_sum_delay obtained in a similar manner from the symbol data of a sample located one over-sample prior to the current one is obtained. In step S24, it is determined whether or not the difference Diff is 0 or more.

In step S24, if the difference Diff is smaller than 0, that is, if the previous error accumulated value err_sum_delay is larger than the current error accumulated value err_sum, the procedure advances to step S25 where it is determined that pattern detection has not been performed, that is, no frequency deviation information Δf is obtained. In step S26, the error accumulated value err_sum_delay is updated with the error accumulated value err_sum, and the procedure is ended.

If the error accumulated value err_sum_delay is set to the maximum value in step S8, so that, in step S24, if the difference Diff is 0 or more, that is, if the current error accumulated value err_sum is equal to or greater than the previous error accumulated value err_sum_delay, that is, the current error accumulated value err_sum is the minimum value up till then, the procedure advances to step S31 where it is determined that pattern detection has been performed, and the temporary frequency deviation information Δf is set as the actual frequency deviation information Δf.

Since the symbol with the minimum error is a symbol of a sample located one over-sample period prior to the current one, the frequency deviation information Δf obtained in step S3 is delayed in advance by one over-sample period in step S32. Subsequently, the error accumulated value err_sum_delay is set to the maximum value, and the procedure is ended.

This sort of processing is repeatedly performed on the symbol value of each over-sample, and, thus, the synchronization word pattern detection circuit 34 can detect a pattern that is closest to the ideal synchronization word precisely from comparison of the ten symbols, without performing complicated calculation such as correlation operation, and can control the timing for the π/4DQPSK symbol recovery circuit 33 and the frame generation circuit 35.

Figure 7:
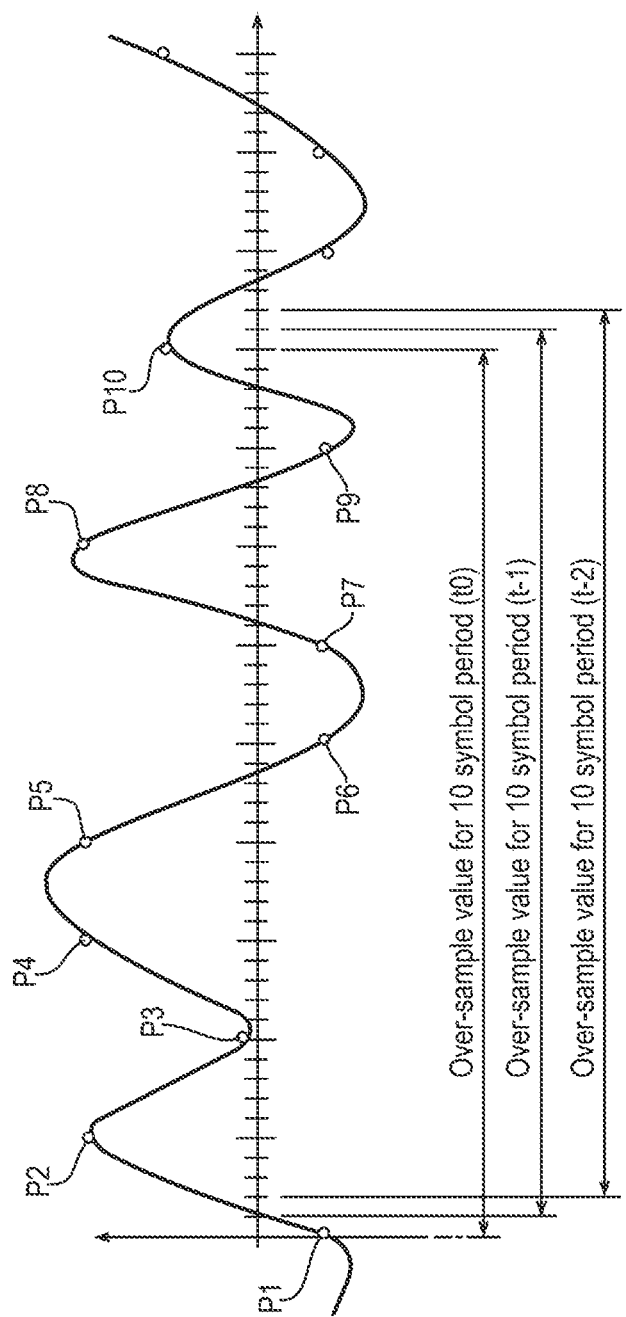
FIG. 7 is a waveform diagram illustrating an operation of the synchronization word pattern detection circuit.

FIG. 7 schematically shows how pattern detection is performed while shifting data each time by one over-sample. The symbol values are indicated by the reference numerals P1 to P10.

The synchronization word pattern detection circuit 34 gives a reset signal to the π/4DQPSK symbol recovery circuit 33 when detecting the synchronization word pattern, and the timing of the internal symbol clock is adjusted.

The synchronization word pattern detection circuit 34 gives a frequency deviation information (DC offset) Δf when detecting a symbol clock to the DC offset correction circuit 50, and DC offset correction is performed as described later until the communication is ended.

Furthermore, if the synchronization word pattern is detected in step S31, the synchronization word pattern detection circuit 34 notifies the π/4DQPSK symbol recovery circuit 33 and the frame generation circuit 35 that the synchronization word pattern is detected, that is, reception is properly performed, and allows the π/4DQPSK symbol recovery circuit 33 to perform symbol recovery and the frame generation circuit 35 to perform frame construction, that is, voice output.

On the other hand, if the synchronization word pattern is not detected in step S7 or S25, the synchronization word pattern detection circuit 34 does not perform the above-described control output.

Before comparison with the ideal symbol data in step S15 and subsequent steps, the synchronization word pattern detection circuit 34 removes the frequency deviation information (DC offset) Δf in step S12. Thus, the threshold (error accumulated value err_sum_delay initially set in steps S8 and S33) for determining whether or not the synchronization word is detected in step S24 can be made strict (15-bit maximum value in the example in FIG. 6), and not only the difference in the error accumulated values (err_sum−err_sum_delay) but also whether or not an error is within a certain range for all symbol points in steps S18 and S19 is considered as a condition for determining whether or not the synchronization word is detected. As a result, frame synchronization can be promptly and precisely established.

The DC offset correction circuit 50 performs processing that reduces over time the frequency deviation information (DC offset) Δf obtained by the synchronization word pattern detection circuit 34.

Figure 8:
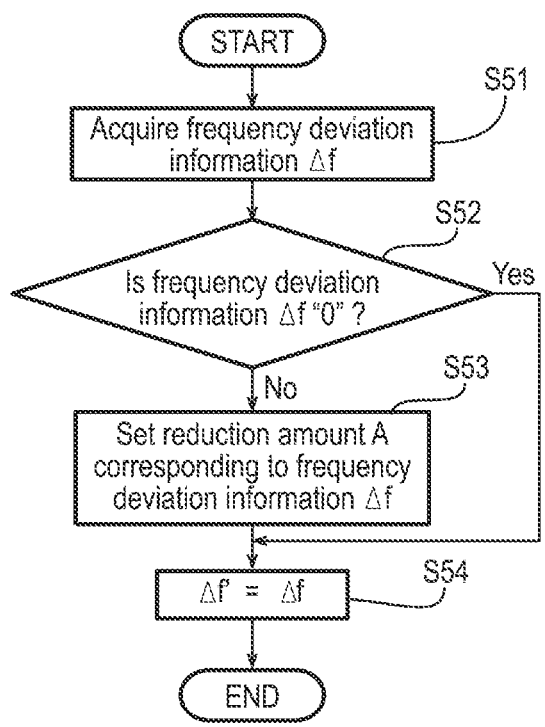
FIG. 8 is a flowchart illustrating a setting operation of the frequency deviation information by the synchronization word pattern detection circuit.

Specifically, as shown in FIG. 8, the frequency deviation information (DC offset) Δf is acquired in step S51. Then, in step S52, if the value is 0, that is, if there is no frequency deviation, the procedure advances to step S54, and, if the value is not 0, that is, if there is frequency deviation, a reduction amount A corresponding to the frequency deviation information (DC offset) Δf is set, after which the procedure advances to step S54.

In step S54, the frequency deviation information (DC offset) Δf is set to the corrected frequency deviation information (DC offset) Δf', and the procedure is ended.

The processing shown in FIG. 8 is performed only when the frequency deviation information (DC offset) Δf is obtained by the synchronization word pattern detection circuit 34 and is set to the DC offset correction circuit 50. Examples of the reduction amount A are shown in Table 2 and FIG. 9.

TABLE 2

| Frequency deviation Δf | Reduction amount A |
|---|---|
| 100 | 10 |
| 90 | 9 |
| 81 | 8 |
| 73 | 7 |
| 66 | 7 |
| 59 | 6 |
| 53 | 5 |
| 48 | 5 |
| 43 | 4 |
| 39 | 4 |
| 35 | 3 |
| 31 | 3 |
| 28 | 3 |
| 25 | 3 |
| 23 | 2 |
| 21 | 2 |
| 19 | 2 |
| 17 | 2 |
| 15 | 2 |
| 14 | 1 |
| 12 | 1 |
| 11 | 1 |
| 10 | 1 |
| 9 | 1 |
| 8 | 1 |

Figure 10:
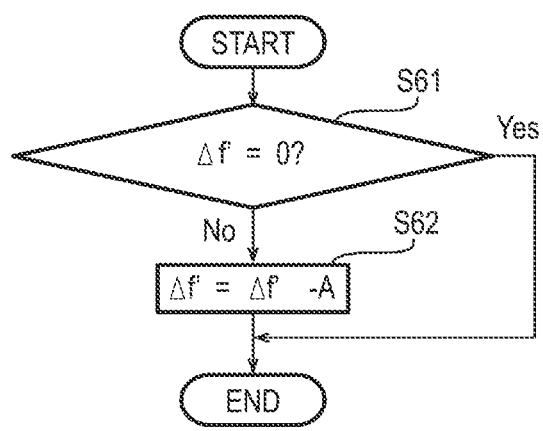
FIG. 10 is a flowchart illustrating an update operation of the frequency deviation information by the synchronization word pattern detection circuit.

The DC offset correction circuit 50 repeats the processing shown in FIG. 10, thereby reducing the frequency deviation information (DC offset) Δf' over time.

Specifically, in step S61, it is determined whether or not the frequency deviation information (DC offset) Δf' is 0. If it is 0, the procedure is ended, and, if it is not 0, the procedure advances to step S62 where the frequency deviation information (DC offset) Δf' is reduced by the reduction amount A and is updated, after which the procedure is ended. The thus obtained corrected frequency deviation information (DC offset) Δf' is given to the π/4DQPSK symbol recovery circuit 33 and the DC offset correction circuit 50.

The frequency deviation information (DC offset) Δf' is used to perform symbol clock correction for allowing the π/4DQPSK symbol recovery circuit 33 to obtain the sample values (frequency deviations) P1 to P10 in FIG. 7, and high-speed pull-in processing that performs the correction by directly subtracting the frequency deviation information (DC offset) Δf' from the sample values (frequency deviations) P1 to P10.

Figure 11:
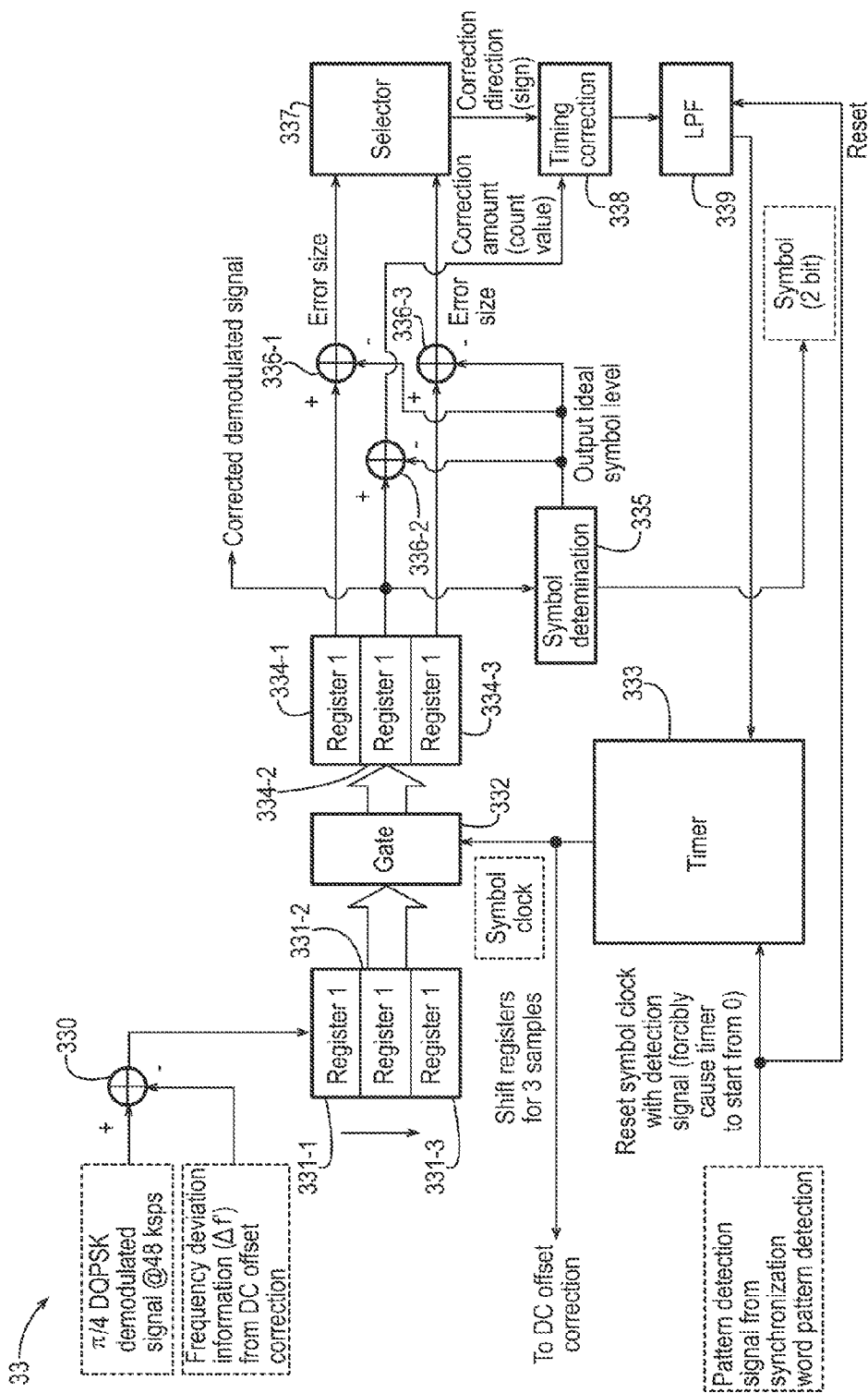
FIG. 11 is a block diagram showing one exemplary configuration of a π/4DQPSK symbol recovery circuit in the radio receiver.

FIG. 11 is a block diagram showing one exemplary configuration of the π/4DQPSK symbol recovery circuit 33. In the π/4DQPSK symbol recovery circuit 33, a demodulated signal over-sampled at a sampling rate that is ten times the symbol rate from the frequency detector 30 is input to a subtracter 330 where the frequency deviation information (DC offset) Δf' obtained by the DC offset correction circuit 50 is subtracted therefrom and correction for the high-speed pull-in processing is performed, after which the signal is input to a shift register 331-1.

The shift register 331-1 is connected in series to two shift registers 331-2 and 331-3, and new sample data that is input is sequentially shifted through these registers. Accordingly, in the over-sample period, three samples are held by the registers such that the newest data is located in the shift register 331-1 and the older data is located in the shift register 331-3.

The subtraction of the frequency deviation information (DC offset) Δf' in the subtracter 330 is limited to situations after the synchronization word pattern is detected by the synchronization word pattern detection circuit 34 in step S24, and, in the state where the temporary frequency deviation information before the detection is used, Δf'=0 is set from the synchronization word pattern detection circuit 34 to the subtracter 330.

Accordingly, when the synchronization word pattern is detected by the synchronization word pattern detection circuit 34, the correction using the frequency deviation information (DC offset) Δf, that is, the high-speed pull-in processing is performed, so that compensation for the frequency deviation information (DC offset) Δf can be promptly performed.

Figure 12:
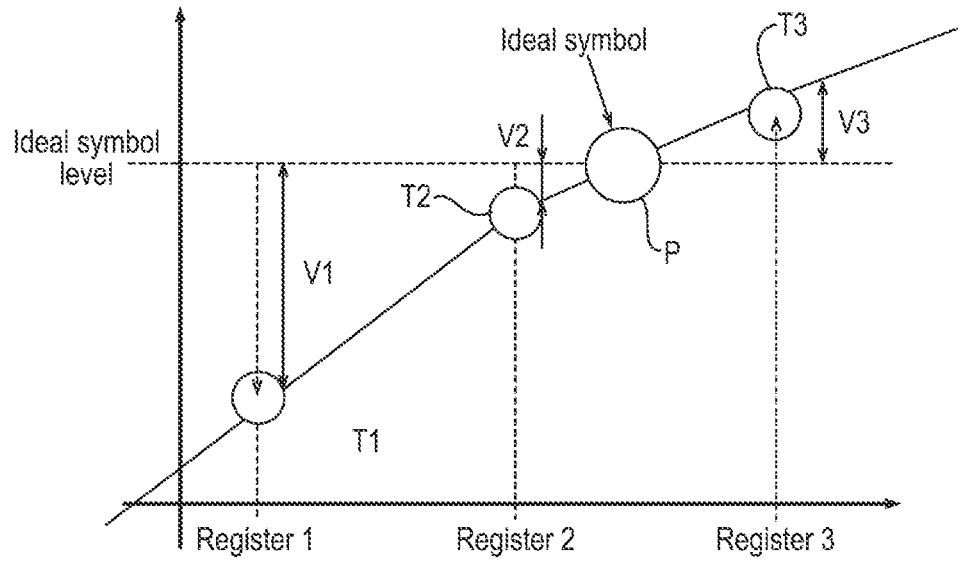
FIG. 12 is a waveform diagram illustrating an operation of the π/4DQPSK symbol recovery circuit.

The stored contents of the shift registers 331-1 to 331-3 are retrieved via a gate circuit 332 respectively by shift registers 334-1 to 334-3 at the timing of the symbol clock generated by a timer 333. Accordingly, the shift registers 334-2, 334-1, and 334-3 store sampling values at a sample point T2 near an ideal symbol point P and sample points T1 and T3 before and after the sample point T2 as shown in FIG. 12.

The sampling value at the sample point T2 is input to a symbol determining unit 335 where it is determined which of "00", "01", "10", and "11" is most probable as the symbol value of the actual symbol point P that is presumed from the sampling value at the sample point T2, and the determination result is output as the 2-bit signal at 4.8 ksps to the frame generation circuit 35.

The symbol determining unit 335 outputs an ideal amplitude level corresponding to the symbol value of the determination result, which is subtracted from the stored contents of the shift registers 334-1 to 334-3 at subtracters 336-1 to 336-3.

From among the subtraction results, that is, the sizes of errors (difference values) V1 to V3 from the ideal amplitude level, the sizes of the errors V1 and V3 at the sampling values at the shift registers 334-1 and 334-3, i.e., at the sample points T1 and T3 are input to a selector 337. The selector 337 determines which of the errors is larger, and outputs the smaller error, that is, the sample point T3 in FIG. 12, as data (indicator) of the direction in which the sample point T2 is to be moved, to a timing correction circuit 338.

Meanwhile, the size of the error V2 at the subtracter 336-2 has been input to the timing correction circuit 338 as correction amount data, and the timing correction circuit 338 outputs a count value corresponding to the correction amount data in combination with a sign as the correction direction data, as a timing control signal via a loop filter 339 to the timer 333.

The loop filter 339 is configured by a low-pass filter such as an IIR filter, and the symbol clock becomes more stable as the time constant increases and has better ability to follow as the time constant decreases.

The timer 333 is configured by a free running counter such as a digital VCO, and the oscillation frequency thereof is set to the symbol frequency. When reaching the symbol period (symbol timing), the timer 333 is reset excluding an overflow amount, and resumes the counting operation. The symbol timing is a time when the phase of the digital VCO passes 0°.

For example, if a phase of 0 to 360° (one symbol period) of the VCO is associated with a count value of 0 to 30000 of the counter, the timer 333 adds 3000 at each over-sample point T, so that a symbol clock can be recovered that enables a symbol value at a symbol rate of 4.8 ksps to be sampled from the over sample data at 48 ksps.

In the case of FIG. 12, the timer 333 initially sets the count value, when the phase of the digital VCO is 0°, to 500, for example, so that the next symbol clock is advanced in the sample point T3 direction, that is, the advancing direction as the correction direction, by 500 counts corresponding to the error V2 at the sample point T2 as the correction amount. Thus, during the 500 counts, the symbol timing is advanced, and the next sample point T2 becomes closer to the actual symbol point P.

Specifically, in the repetition of the count operation, if correction with the count value 500 is performed, the timer 333 overflows at 30500, is reset at that time, resumes the counting operation in a state where a current correction value 500 is added to 500 excluding the overflow amount, and next overflows at 31000. In this manner, if the total of correction values reaches 3000, the sampling timing is advanced by one sample.

Figure 13:
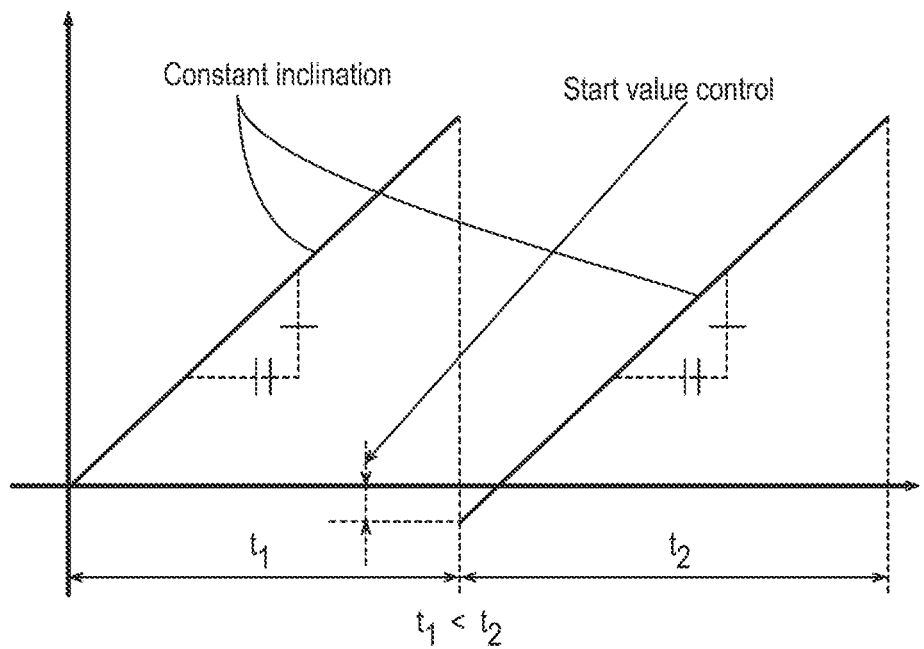
FIG. 13 is a waveform diagram illustrating a count operation of a timer in the π/4DQPSK symbol recovery circuit.

FIG. 13 shows a case in which the initial value is set to a negative value and the symbol timing is delayed as an example of the counting operation of the timer 333. If the maximum value of the timer 333 is increased, the resolution increases, and, if the sampling rate of the over-sample is increased, the correcting precision is improved.

Providing a dead zone in which the above-described timing correction is not performed if the error V2 at the sample point T2 is smaller than a predetermined value can improve the stability. The timer 333 is forcibly reset to 0 at the detection timing of the synchronization word pattern in response to the reset signal from the synchronization word pattern detection circuit 34, and resumes the counting operation.

After the synchronization word pattern detection circuit 34 detects the synchronization word pattern and the timer 333 of the π/4DQPSK symbol recovery circuit 33 is reset to 0, the synchronization word can be detected with the above-described ordinary symbol recovery in the π/4DQPSK symbol recovery circuit 33, and, thus, the synchronization word pattern detection circuit 34 does not perform the detecting operation of the synchronization word pattern until the communication (call) is ended.

In this manner, the π/4DQPSK symbol recovery circuit 33 samples a demodulated signal at a predetermined symbol point, and, when recovering the demodulation data from the amplitude value of the obtained symbol data, the shift registers 331-1 to 331-3, the gate circuit 332, the shift registers 334-1 to 334-3, the symbol determining unit 335, and the subtracters 336-1 to 336-3 obtain difference values V1 to V3 from the ideal amplitude level that is to be obtained at the symbol point P, for three symbol data sets consisting of the sample point T2 near the symbol point P among the symbol data sets obtained by over-sampling the demodulated signal at a frequency higher than the symbol clock, and the sample points T1 and T3 before and after the sample point T2, and the selector 337 selects a measurement point having the smaller difference value V1 or V3 from among the sample points T1 and T3 before and after the sample point T2.

The timing correction circuit 338 shifts the sampling timing of the next symbol point of the free running timer 333, toward the sample point T3 selected by the selector 337, which is a selecting unit, by the time corresponding to the difference value V2 at the sample point T2.

Accordingly, for example, also in the case of four-valued modulated waves consisting of "00", "01", "10", and "11", shift that does not cross over the median, such as "00" and "01" or "10" and "11", shift that crosses over the median but has unequal deviations from the median, such as "00" and "10" or "01" and "11", the π/4DQPSK symbol recovery circuit 33 corrects the sampling timing each time by the over-sampling period at a maximum.

In this manner, the π/4DQPSK symbol recovery circuit 33 can recover a stable symbol clock from the multi-valued modulated waves. This sort of correcting operation of the sampling timing in the π/4DQPSK symbol recovery circuit 33 does not depend on the aperture ratio of an eye pattern, and, thus, it is possible to easily respond to a change in the roll-off factor.

Furthermore, since the timing calculation is performed approximately at three points consisting of the sample point T2 near the symbol point P and the sample points T1 and T3 before and after the sample point T2, the calculation amount in the π/4DQPSK symbol recovery circuit 33 can be reduced.

This sort of method for recovering the symbol clock at the π/4DQPSK symbol recovery circuit 33 is not limited to the phase modulation, and may be applied to various modulation schemes having an eye pattern such as a frequency modulation.

Since the free running timer 333 and the loop filter 339 are forcibly reset at the detection time of the synchronization word pattern in the synchronization word pattern detection circuit 34, the π/4DQPSK symbol recovery circuit 33 can recover a precise symbol clock from the head of the main body data (traffic channel).

Furthermore, since the subtracter 330 performs the correction by the frequency deviation information (DC offset) Δf' from the demodulated signal, the π/4DQPSK symbol recovery circuit 33 can make the symbol data obtained at the sample point T2 closer to the ideal amplitude level, thereby recovering a more stable clock.

The demodulated signal corrected by the high-speed pull-in processing by the π/4DQPSK symbol recovery circuit 33 is given to the DC offset correction circuit 51 where low-speed pull-in processing is performed.

The DC offset correction circuit 51 obtains the DC offset from the average value of the input demodulated signals, and corrects the oscillation frequency of the local oscillator 223 or 243 (223 in the example in FIG. 2).

Accordingly, the total offset correction of the radio receiver 1 as described above can be represented by a numerical expression as below.

$$fc(t) = frx - (Adj\_local(t) + Adj\_Del(t)) - (Adj\_DC - Adj\_Del(t)) \quad (1)$$

where fc(t): center reception frequency (with shift due to DC offset) in symbol determining of the receiving station;

frx: center transmission frequency of the other station (fixed value);

Adj_local(t): reception frequency deviation correction value by low-speed pull-in processing;

Adj_DC: reception frequency deviation correction value by high-speed pull-in processing (fixed value set in synchronization detection); and Adj_Del(t): reception frequency correction amount that is to be substantially given from high-speed pull-in processing to low-speed pull-in processing.

That is to say, the correction with (Adj_DC−Adj_Del(t)) is the high-speed pull-in processing, and the correction with (Adj_local(t)+Adj_Del(t)) is the low-speed pull-in processing. In comparison with the description above, Adj_DC=Δf, Adj_Del(t)=A, and Adj_DC−Adj_Del(t)=Δf'.

Figure 14:
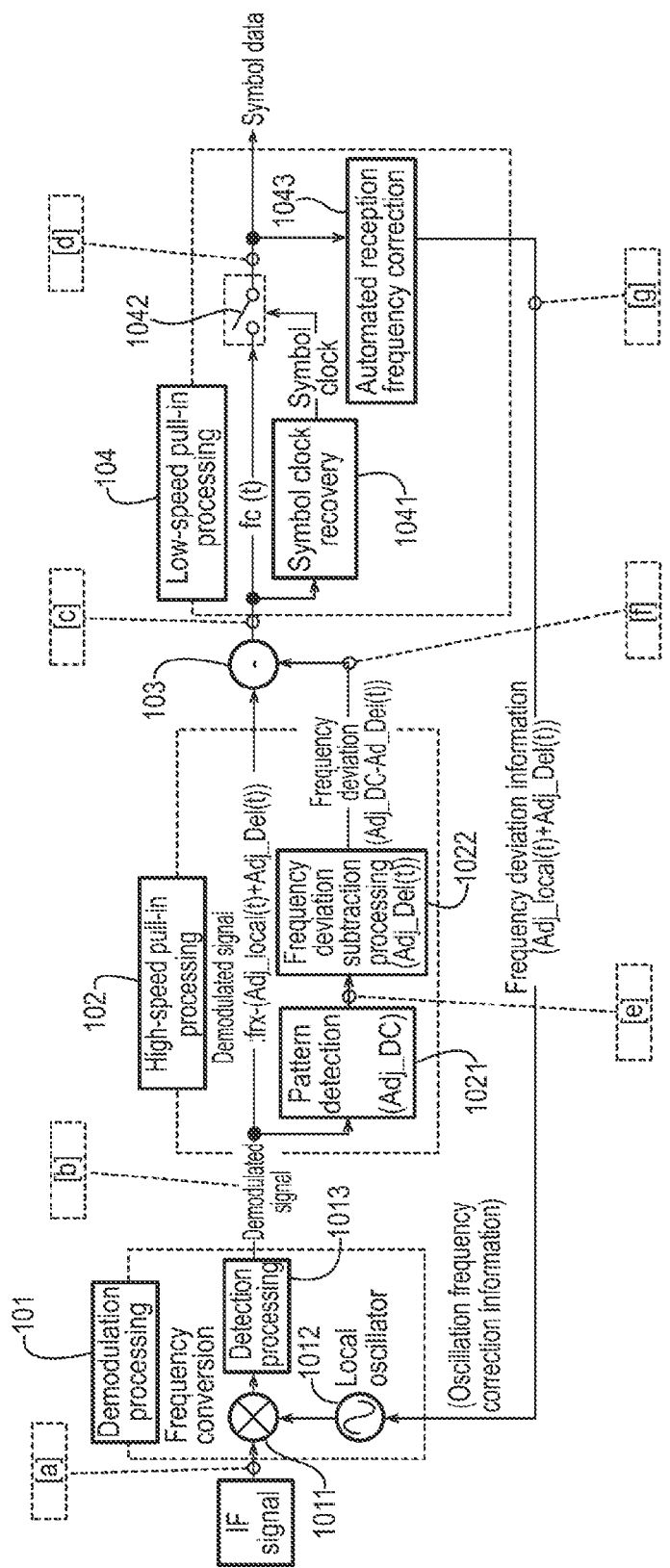
FIG. 14 is a simplified functional block diagram obtained by extracting the main portion of the radio receiver according to the embodiment of the present invention.

The above-stated numerical expression can be represented by extracting the main portion from FIG. 2, as a simplified functional block diagram as shown in FIG. 14. In FIG. 14, an intermediate-frequency signal input to a demodulation processing unit 101 is mixed by a mixer 1011 with a local oscillation signal from a local oscillator 1012, so that the frequency is changed, and is further subjected to band-pass filtering at a detection processing unit 1013, so that a demodulated (detected) signal is obtained.

The demodulated (detected) signal is input to a high-speed pull-in processing unit 102 where a pattern detection unit 1021 detects the synchronization word pattern and obtains a reception frequency deviation correction value Adj_DC.

Then, a frequency deviation subtraction processing unit 1022 arranged after the pattern detection unit 1021 subtracts the reception frequency correction amount Adj_Del(t) from the reception frequency deviation correction value Adj_DC, thereby reducing the reception frequency deviation correction value Adj_DC over time.

A subtracter 103 subtracts the thus obtained correction value (Adj_DC−Adj_Del(t)) for the high-speed pull-in processing from the demodulated (detected) signal, thereby performing the high-speed pull-in processing, so that the demodulated (detected) signal after the processing is input to a low-speed pull-in processing unit 104 arranged after the subtracter 103.

In the low-speed pull-in processing unit 104, the demodulated (detected) signal is input to a symbol clock recovery unit 1041, and the demodulated (detected) signal is sampled by a sampler 1042 at the timing of the recovered clock, and is output as the symbol data. Meanwhile, the demodulated (detected) signal is fed back by an automated reception frequency correction unit 1043 to the local oscillator 1012, so that the low-speed pull-in processing is performed.

Accordingly, as is clear from the above-stated numerical expression and FIG. 14, in the high-speed pull-in processing, the reception frequency correction amount Adj_Del(t)(=A) is repeatedly subtracted from the basic reception frequency deviation correction value Adj_DC(=Δf), so that the influence of the high-speed pull-in processing acting on the demodulated signal is reduced over time.

Then, in subsequent steps, if the reception frequency deviation (Adj_local(t)+Adj_Del(t)) from the low-speed pull-in processing is fed back to the local oscillator 1012 so that the correction is performed, as described above, the reception frequency correction amount Adj_Del(t)(=A) is given from the high-speed pull-in processing to the low-speed pull-in processing, and the DC offset is detected in the low-speed pull-in processing, and, thus, the oscillation frequency of the local oscillator 223 (243) is corrected.

In this manner, in combined use of the high-speed pull-in processing that promptly extracts the DC offset and can perform the demodulation from the first frame data and the low-speed pull-in processing that performs the processing slowly but can accurately detect the DC offset, the DC offset obtained in the high-speed pull-in processing is gradually reduced and given to the low-speed pull-in processing, so that a break in the start of speech and the like do not occur, and the level of precision in establishing the frame synchronization (call acceptance rate) can be improved, and, finally, the local oscillation frequency is accurately corrected only based on the average value of the demodulated signal by the low-speed pull-in processing, so that the noise immunity and the receiver sensitivity can be improved.

Figure 15:
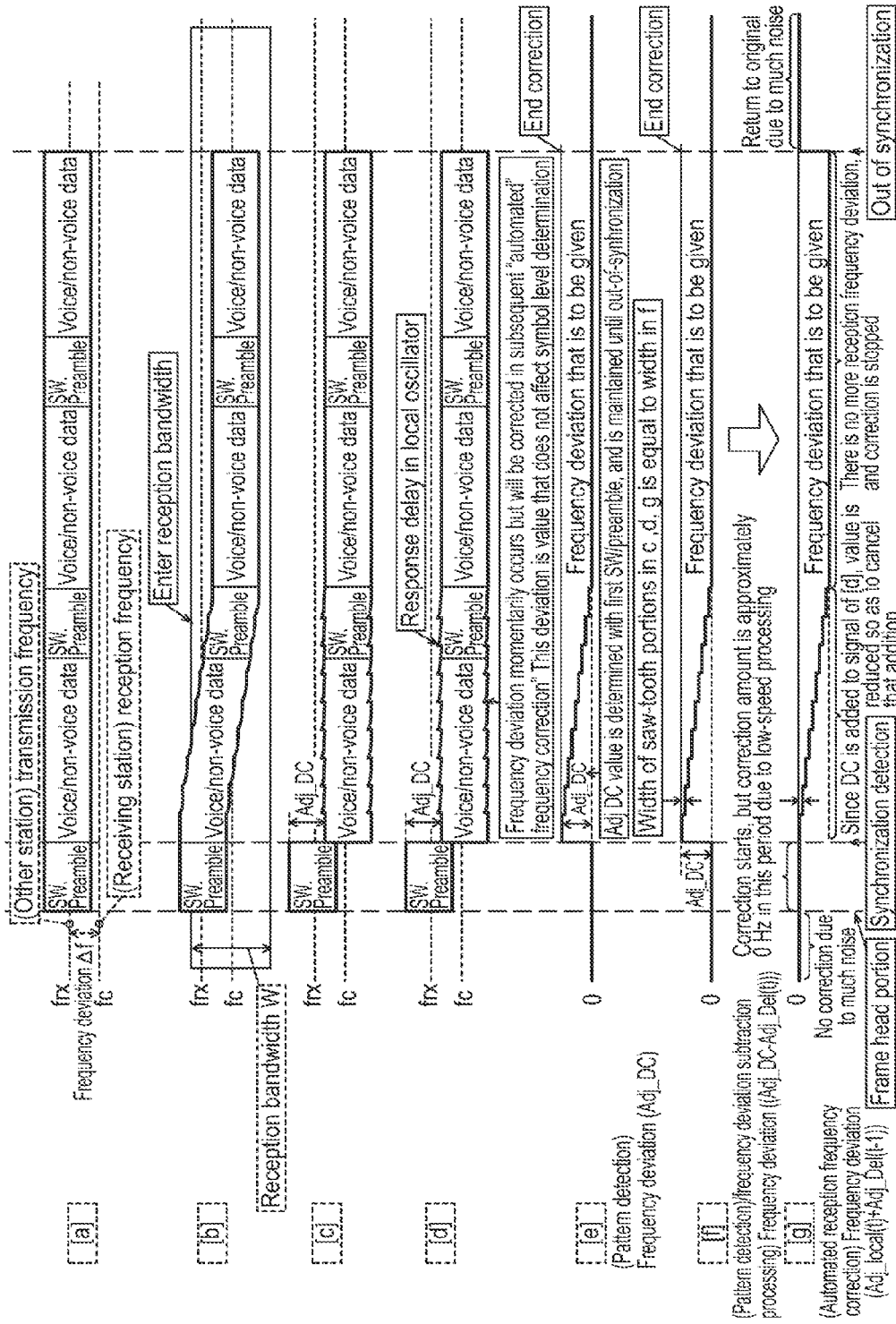
FIG. 15 is a diagram showing schematic waveforms at respective points in the radio receiver in FIG. 14.

FIG. 15 shows schematic waveforms at points indicated by [a] to [g] in FIG. 14. If the center reception frequency fc(t) of the receiving station is off by the frequency deviation Δf from the center transmission frequency frx of the other station as shown in [a], a portion out of a reception bandwidth W, that is, the pass bandwidth of the band-pass filter of the detection processing unit 1013 is distorted as shown in [b].

However, in this embodiment, in the pattern detection unit 1021, the synchronization word pattern is detected as shown in [c] and the reception frequency deviation correction value Adj_DC is obtained as shown in [e], and, thus, the subtraction from the demodulated (detected) signal is immediately performed by the high-speed pull-in processing and voice/non-voice data is demodulated.

Note that the output after the high-speed pull-in processing in [c] and the output after the low-speed pull-in processing in [d] differ from each other substantially only by whether or not the sampling by the sampler 1042 is performed, and, thus, they are indicated as the same level in FIG. 15.

Then, as shown in [f], the reception frequency deviation correction value Adj_DC is reduced by the frequency deviation subtraction processing unit 1022 each time by the reception frequency correction amount Adj_Del(t), so that the correction value (Adj_DC−Adj_Del(t)) for the high-speed pull-in processing is reduced over time.

Subsequently, in the subtracter 103, the correction value (Adj_DC−Adj_Del(t)) for the high-speed pull-in processing is subtracted from the demodulated (detected) signal, so that the high-speed pull-in processing is performed.

Meanwhile, the demodulated (detected) signal corrected by the high-speed pull-in processing is fed back by the automated reception frequency correction unit 1043 to the local oscillator 1012 as shown in [g], so that the reception frequency correction amount Adj_Del(t) is given to the low-speed pull-in processing.

In this manner, as shown in [b], the demodulated (detected) signal enters the reception bandwidth W, and, thus, the distortion is reduced, and the radio receiver 1 of this embodiment can finally cause the center reception frequency fc(t) of the receiving station to match the center transmission frequency frx of the other station, thereby eliminating the distortion.

Note that portions before the frame head prior to the synchronization detection are not subjected to any correction because there is much noise and the squelch circuit 43 and the correction control circuit 52 prohibit the high-speed pull-in processing by the DC offset correction circuit 50.

Frequency deviation momentarily occurs in the demodulated (detected) signal immediately after the reception frequency correction amount Adj_Del(t) is subtracted in the high-speed pull-in processing, but the reception frequency correction amount Adj_Del(t)(=the reduction amount A) is set to a value that does not affect symbol determination at the automated reception frequency correction unit 1043.

The momentary frequency deviation is corrected before the next subtraction processing of the reception frequency correction amount Adj_Del(t) with the feedback control of the local oscillator 1012 in the low-speed pull-in processing, so that the frequency deviation does not accumulate.

Although FIG. 15 shows the case in which the correction is performed nine times per frame period for the sake of simplicity of the drawing, actually, for example, one frame period is 40 msec, and the subtraction processing period, that is, the calculation period in FIG. 10 is 0.4 to 4 msec (2 to 20 symbols), so that the correction is performed approximately 9 to 100 times.

Figure 9:
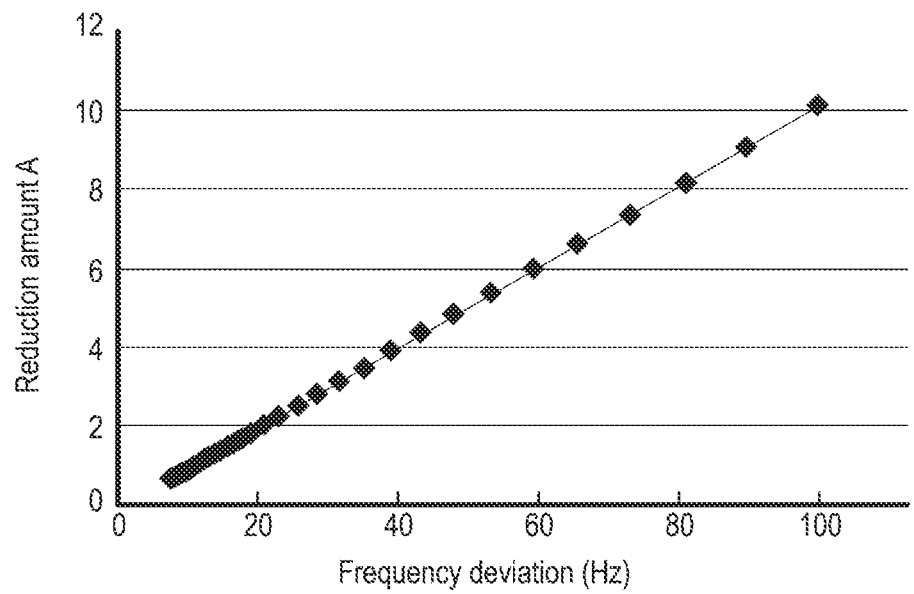
FIG. 9 is a graph illustrating reduction amounts used for updating the frequency deviation information in the synchronization word pattern detection circuit.

Accordingly, if the reduction amount A (=reception frequency correction amount Adj_Del(t) in Table 2 and FIG. 9 is set to ±100 Hz, the high-speed pull-in processing is ended at a maximum approximately within 40 msec, which is within one frame period (Δf'=0)

Hereinafter, a conventional simple configuration in which the high-speed pull-in processing and the low-speed pull-in processing are combined will be described. Such a configuration corresponds to that obtained by excluding the frequency deviation subtraction processing unit 1022 from the high-speed pull-in processing unit 102 in FIG. 14.

Accordingly, the reception frequency deviation correction value Adj_DC(=Δf) obtained in the pattern detection unit 1021 is used as it is and does not change until the call is ended. Accordingly, as in Numerical Expression 1, the offset correction in this configuration can be represented by a numerical expression as below.

$$fc(t)=(frx-Adj\_local(t))-Adj\_DC \qquad (2)$$

Figure 16:
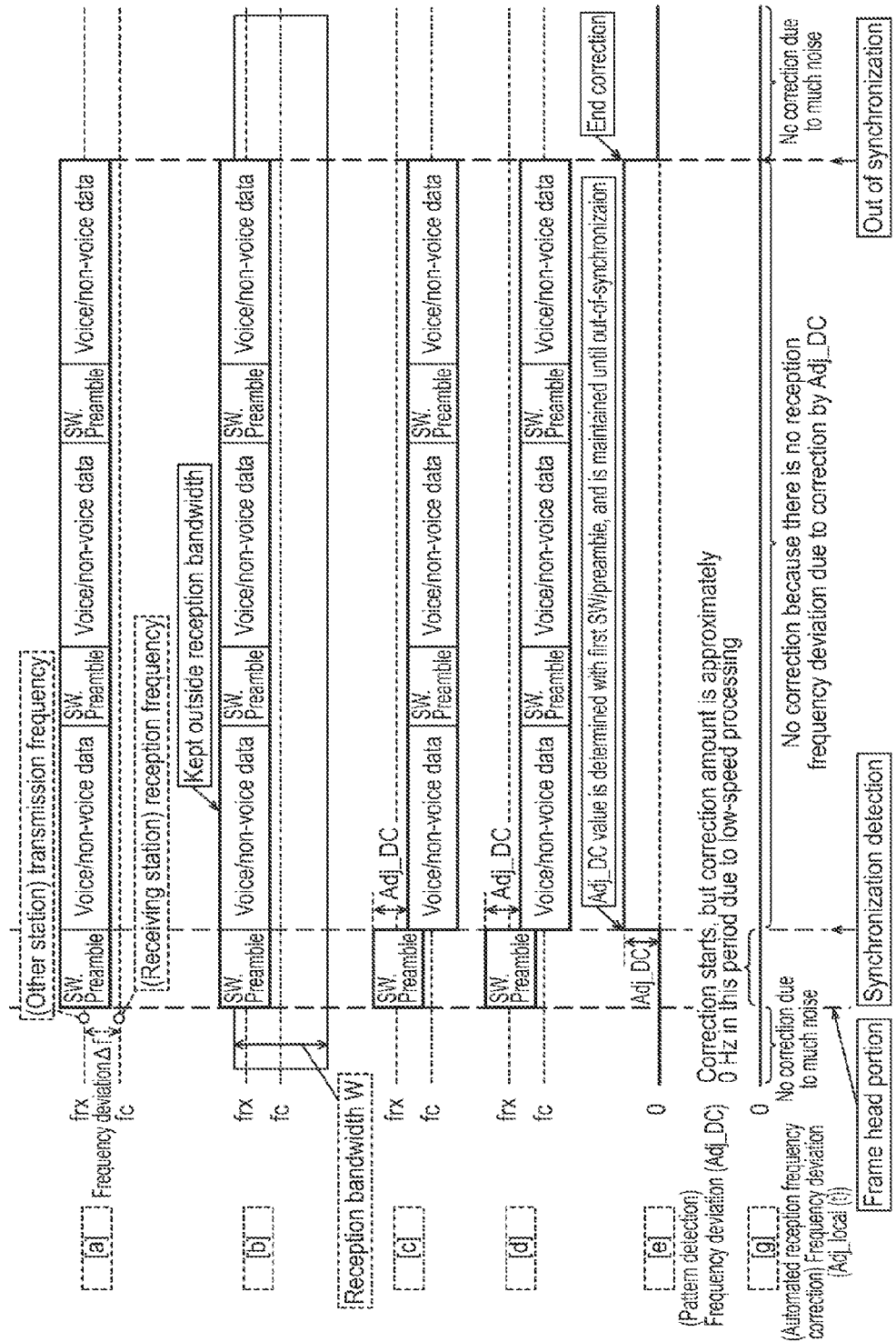
FIG. 16 is a diagram showing schematic waveforms at respective points in a conventional radio receiver in comparison with the radio receiver in FIG. 14.
Figures 17A, 17B, 17C:
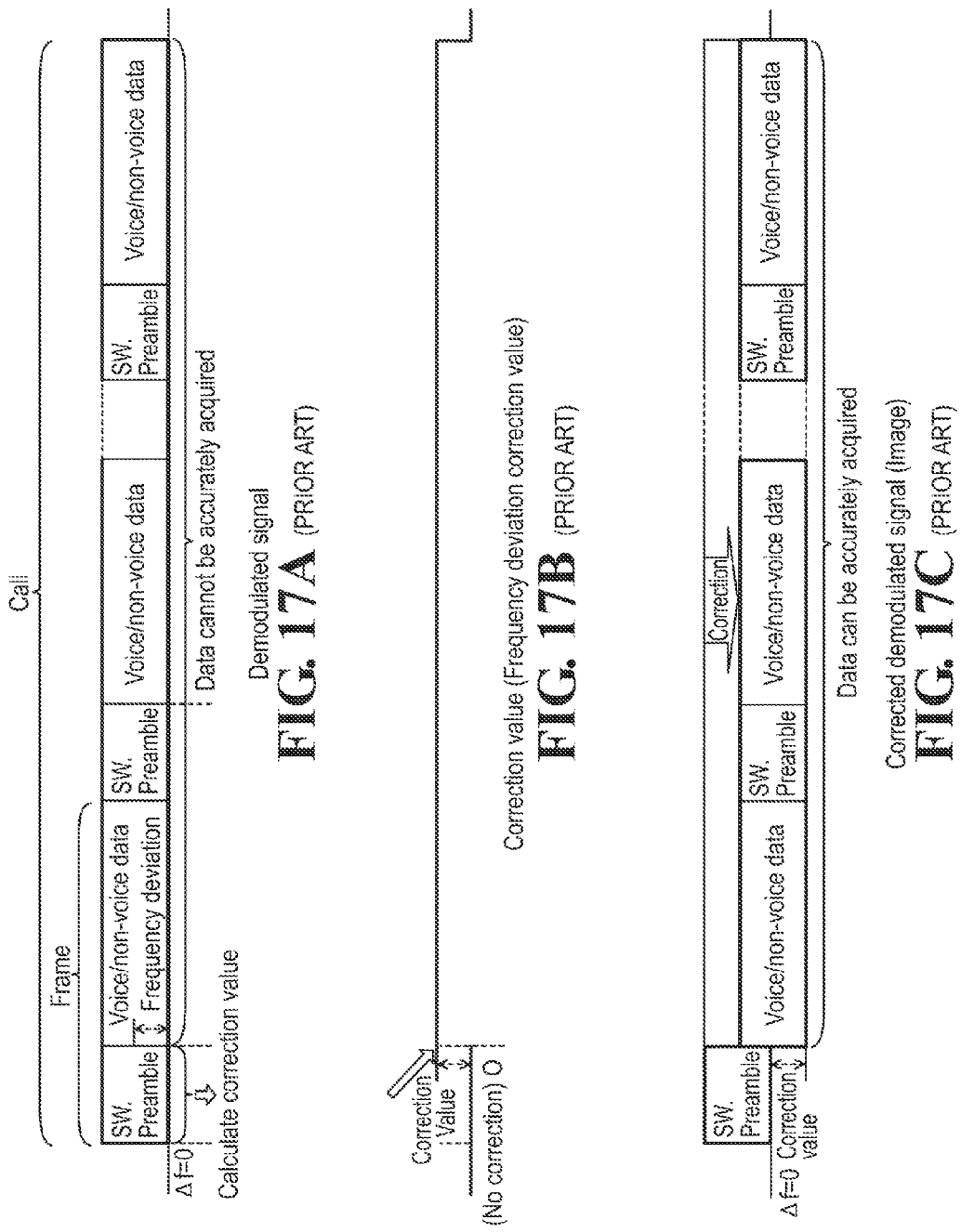
FIGS. 17A to 17C are waveform diagrams schematically showing high-speed pull-in processing, which is an example of a method for correcting DC offset caused by transmission and reception frequency deviation in a radio receiver.

FIG. 16 shows schematic waveforms according to this configuration. FIG. 16 shows waveforms at points indicated by [a] to [e] and [g] in FIG. 14, as in FIG. 15.

Comparison between FIGS. 15 and 16 shows that, if the high-speed pull-in processing using the reception frequency deviation correction value Adj_DC is performed to some extent as appropriate, the reception frequency deviation correction value Adj_local(t) that is to be fed back to the local oscillator 1012 for the low-speed pull-in processing is substantially 0 as shown in [g], and the low-speed pull-in processing does not substantially function.

Figure 18:
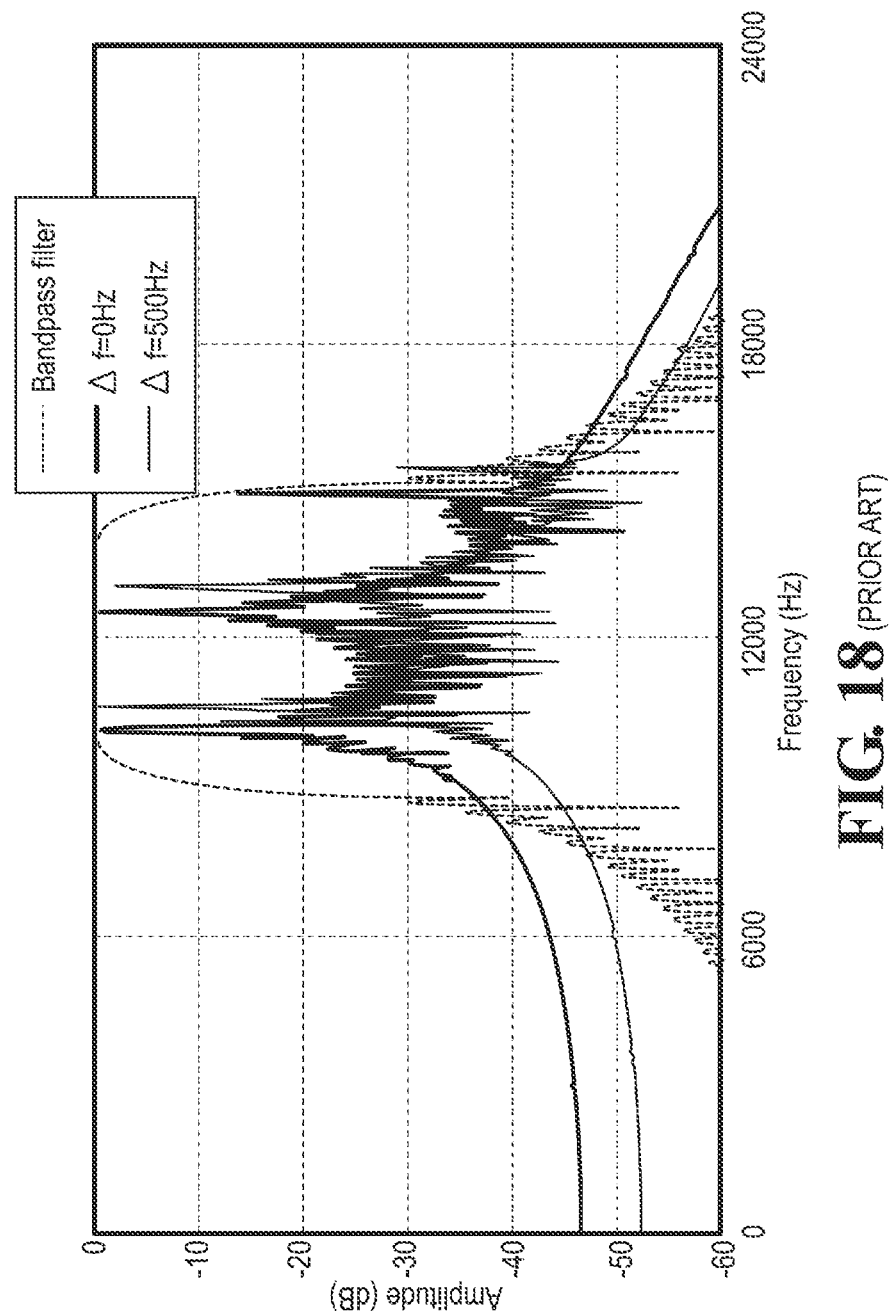
FIG. 18 is a waveform diagram showing a relationship between a demodulated signal and a band-limiting filter for detection.
Figure 19:
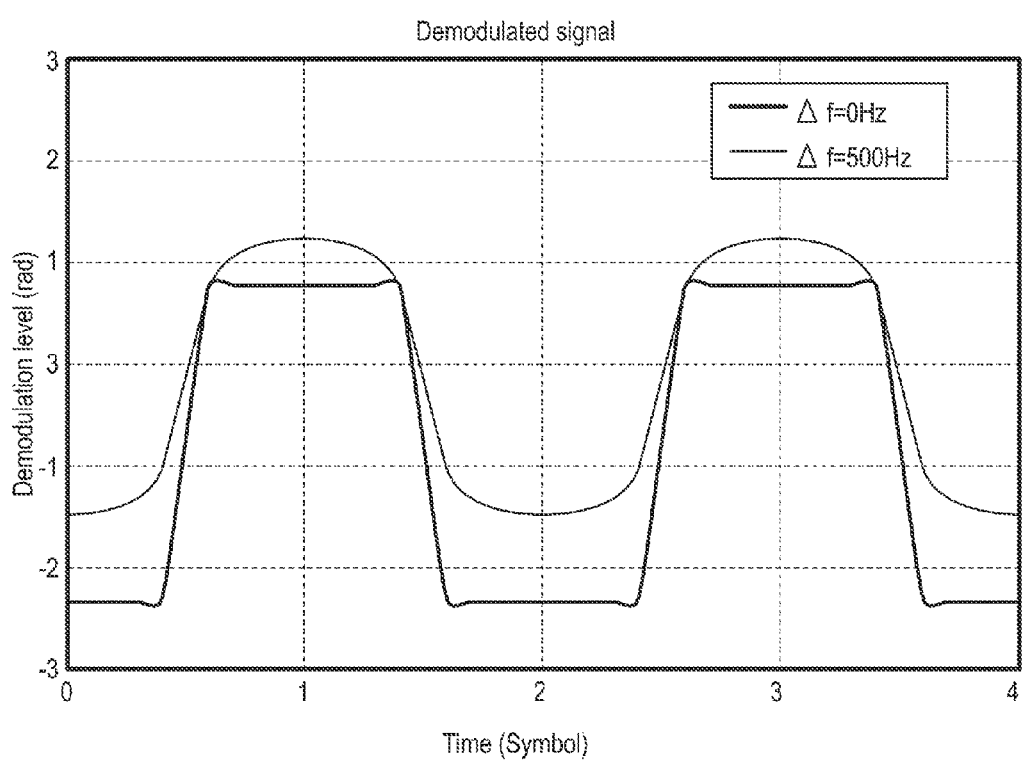
FIG. 19 is a waveform diagram showing distortion of the demodulated signal in a case where frequency shift has occurred in the demodulated signal from the band-limiting filter.
Figure 20A:
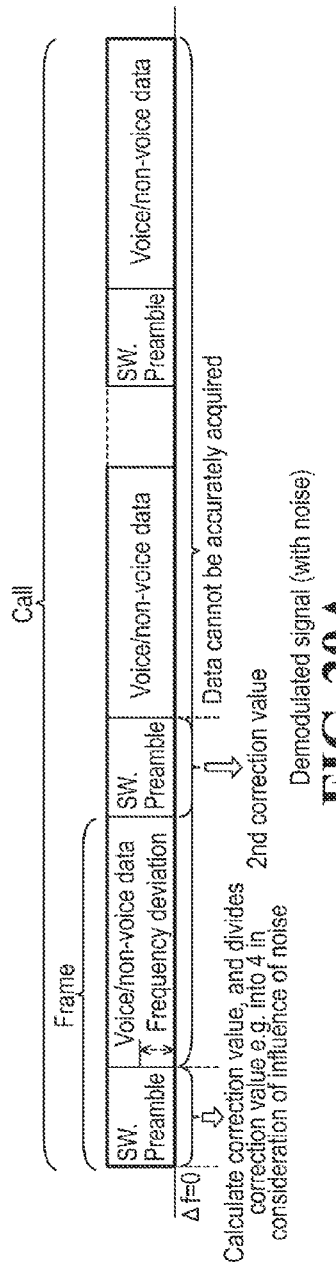
FIGS. 20A to 20C are waveform diagrams schematically showing an improvement example of the high-speed pull-in processing.
Figure 20B:
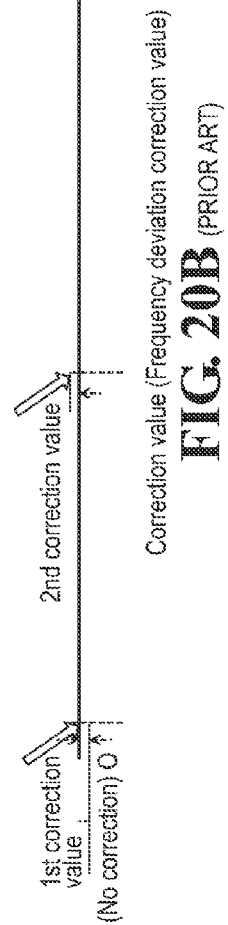
Figure 20C:
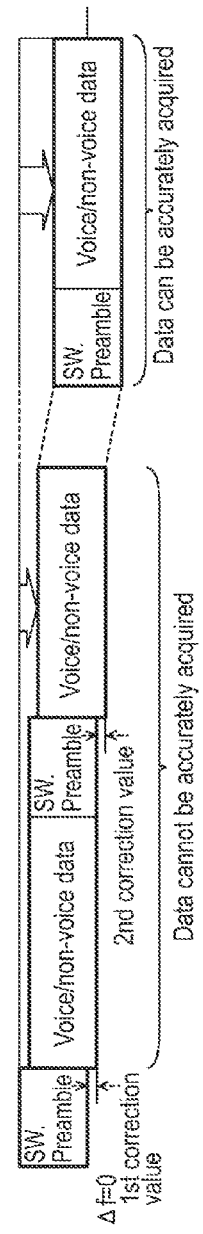
Figure 21A:
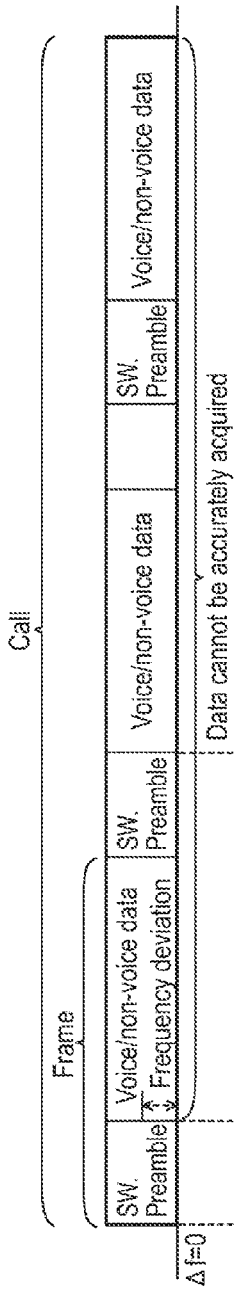
FIGS. 21A to 21C are waveform diagrams schematically showing low-speed pull-in processing, which is another example of the method for correcting DC offset caused by transmission and reception frequency deviation in a radio receiver.
Figure 21B:
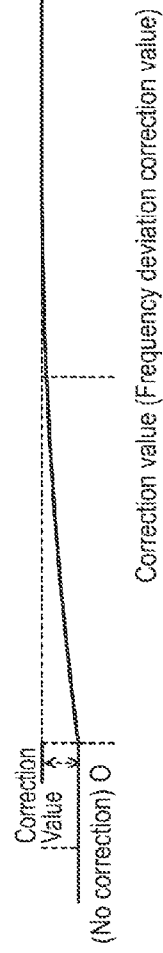
Figure 21C:
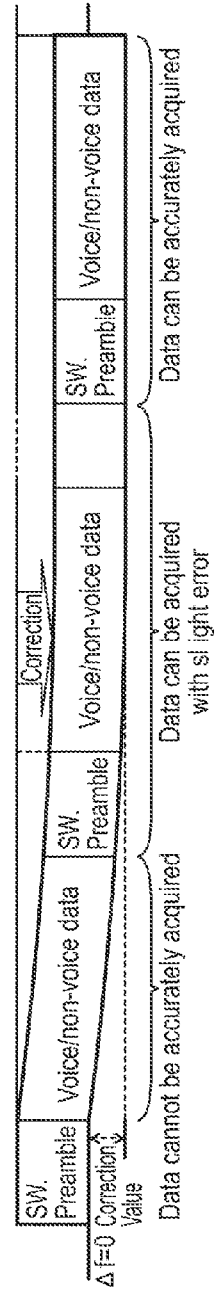

Thus, the received signal is still out of the reception bandwidth W as shown in [b], that portion out of the reception bandwidth W is lost by the filtering as shown in FIG. 18, and the demodulated signal is distorted as shown in FIG. 19.

In this manner, the sensitivity deteriorates, and the reliability of the obtained DC value is lowered, and the level of precision in establishing the frame synchronization (call acceptance rate) is also lowered. Comparison between this embodiment (FIG. 15) and the conventional technique in FIGS. 17A to 17C, 20A to 20C, and 21A to 21C also shows the same result.

In the foregoing embodiment, the reception frequency correction amount Adj_Del(t) is shared by the high-speed pull-in processing and the low-speed pull-in processing, but it is preferable that the time constant of a reduction in the reception frequency correction amount Adj_Del(t)(DC offset) in the high-speed pull-in processing is larger than the time constant of a change in the average value (Adj_local(t)) in the low-speed pull-in processing.

In this case, the automated reception frequency correction unit 1043 may retrieve the demodulated (detected) signal before the subtraction by the subtracter 103, subtract the reception frequency deviation correction value Adj_DC therefrom, and obtain a feedback value from the demodulated (detected) signal to which a reception frequency correction amount Adj_Del'(t), having the time constant larger than that of the reception frequency correction amount Adj_Del(t), has been obtained based on the reception frequency deviation correction value Adj_DCand added. Specifically, the reception frequency correction amount Adj_Del'(t) may be values smaller by one level or more than those in Table 2.

With this configuration, in order to increase noise immunity, it is conceivable to earlier increase the influence of the reliable average value, that is, the influence of the low-speed pull-in processing. However, since the response of a change in the average value is slow, the influence of the high-speed pull-in processing is maintained until the average value sufficiently increases, so that the oscillation frequency of the local oscillator 11 can be more properly corrected.

In the radio receiver 1 of this embodiment, it is preferable that the modulation scheme is the π/4DQPSK modulation scheme. The reason for this is that, compared with the FSK modulation scheme, the QPSK modulation scheme increases the electric power consumed by the power amplifier, but can double the transmission baud rate in the same occupied bandwidth (although it depends on the frame format), thereby increasing the amount of data that can be transferred, or shortening the time required for the communication.

On the other hand, unlike the FSK modulation scheme using the frequency band only approximately half the occupied bandwidth, the QPSK modulation scheme uses almost all the frequency band of the occupied bandwidth, and, thus, if the frequency has been shifted, leakage to an adjacent channel may occur during transmission.

Thus, the present invention is effective especially for the QPSK modulation scheme. In particular, the π/4DQPSK modulation scheme in which the phase of the QPSK modulation scheme is shifted by 45° to reduce amplitude change is more preferable because it can reduce the electric power consumed by the power amplifier.

Furthermore, in the radio receiver 1 of this embodiment, if the noise level detected by the squelch circuit 43 is larger than a predetermined threshold value, the correction control circuit 52 stops the high-speed pull-in processing by the DC offset correction circuit 50. Thus, in particular when the bit synchronization is not established, erroneous offset correction due to noise can be prevented.

Note that the present inventor has proposed Japanese Patent No. 5304089 as Patent Document 2. This prior art is directed to a multi-valued (four-valued in an embodiment) FSK receiver configured to sequentially update and acquire a maximum value and a minimum value of the amplitude of a demodulated signal, and, if a predetermined threshold value is reached, determine that a true maximum value and a true minimum value are obtained in the multi-valued signal, obtain their median as DC offset, and correct the demodulated signal and the oscillation frequency of the local oscillator.

The high-speed pull-in processing and the low-speed pull-in processing are used in combination, DC offset obtained only from the first synchronization word is used as it is for subtraction from the demodulated signal until the call is ended, and the sequentially updated average value is used for correcting the local oscillation frequency. Accordingly, this technique is close to the conventional technique shown in FIG. 16, except that a proper maximum value and a proper minimum value of the amplitude are obtained.

One aspect of the present invention is directed to a radio receiver using a modulation scheme in which a frequency shift from a radio transmitter appears as DC offset in a demodulated signal, including: a first correcting unit configured to perform high-speed pull-in processing by subtracting, from the demodulated signal, the DC offset obtained from a difference between a DC value of a predetermined number of symbol patterns of the demodulated signal and a known DC value of symbol patterns of a synchronization signal; and a second correcting unit configured to perform low-speed pull-in processing by obtaining the DC offset from an average value of the demodulated signal from the first correcting unit and correcting an oscillation frequency of a local oscillator; wherein, after performing the high-speed pull-in processing, the first correcting unit reduces the DC offset that is to be subtracted from the demodulated signal, over time in each predetermined period of time.

Another aspect of the present invention is directed to a frequency correcting method for a radio receiver using a modulation scheme in which a frequency shift from a radio transmitter appears as DC offset in a demodulated signal, including: a first offset calculating step of obtaining the DC offset from a difference between a DC value of a predetermined number of symbol patterns of the demodulated signal and a known DC value of symbol patterns of a synchronization signal; a first correcting step of performing high-speed pull-in processing by subtracting the DC offset obtained in the first offset calculating step from the demodulated signal; a second offset calculating step of obtaining the DC offset from an average value of the demodulated signal corrected in the first correcting step; and a second correcting step of performing low-speed pull-in processing by correcting an oscillation frequency of a local oscillator with the DC offset obtained in the second offset calculating step; wherein, in the first offset calculating step, the DC offset that is to be subtracted from the demodulated signal is reduced over time in each predetermined period of time.

With this configuration, in a radio receiver using a modulation scheme such as FSK or QPSK in which a frequency shift from a radio transmitter appears as DC offset in a demodulated signal, the high-speed pull-in processing by a first correcting unit and the low-speed pull-in processing by a second correcting unit are used in combination for correcting the DC offset.

In the high-speed pull-in processing, the first correcting unit performs a first offset calculating step of obtaining the DC offset from a difference between a DC value of a predetermined number of symbol patterns of the demodulated signal and a known DC value of symbol patterns of a synchronization signal in which predetermined symbols are continuously arranged, and a first correcting step of subtracting the DC offset from the demodulated signal. The synchronization signal includes a preamble and a synchronization word. Accordingly, symbols can be promptly extracted, and the demodulation can be performed from the data of the first frame.

On the other hand, in the low-speed pull-in processing, the second correcting unit performs a second offset calculating step of obtaining the DC offset from an average value of the demodulated signal, and a second correcting step of correcting an oscillation frequency of a local oscillator, that is, of causing the frequency to match a center frequency of a band-pass filter. Accordingly, the processing is performed only slowly, but data can be accurately demodulated.

In the present invention, in combined use of the high-speed pull-in processing and the low-speed pull-in processing, the demodulated signal corrected by the first correcting unit is given to the second correcting unit, and the first correcting unit reduces the DC offset that is to be subtracted from the demodulated signal, over time in each predetermined period of time.

That is to say, the high-speed pull-in processing is performed by the first correcting unit, so that voice/non-voice data and the like can be demodulated from the first frame of a call, a break in the start of speech and the like do not occur, and the level of precision in establishing the frame synchronization (call acceptance rate) can be improved.

Furthermore, the first correcting unit gradually reduces over time the DC offset value that is to be subtracted from the demodulated signal in the high-speed pull-in processing, thereby gradually reducing the influence of the high-speed pull-in processing acting on the low-speed pull-in processing by the second correcting unit, and, finally, the local oscillation frequency is accurately corrected only based on the average value of the demodulated signal by the low-speed pull-in processing. Thus, it is possible to increase noise immunity, and to prevent the received signal from being partially lost by a band-limiting band-pass filter (prevent the sensitivity from deteriorating).

In the radio receiver according to another aspect of the present invention, a time constant of a reduction in the DC offset by the first correcting unit is larger than a time constant of a change in the average value by the second correcting unit.

With this configuration, in order to increase noise immunity, it is conceivable to earlier increase the influence of the reliable average value. However, since the response of a change in the average value is slow, the influence of the DC offset by the first correcting unit is maintained until the average value sufficiently increases. Accordingly, the oscillation frequency of the local oscillator can be more properly corrected.

In the radio receiver according to another aspect of the present invention, the modulation scheme is a $\pi/4$ shift QPSK modulation scheme.

With this configuration, compared with the FSK modulation scheme, the QPSK modulation scheme increases the electric power consumed by the power amplifier, but can double the transmission baud rate in the same occupied bandwidth (although it depends on the frame format), thereby increasing the amount of data that can be transferred, or shortening the time required for the communication.

On the other hand, unlike the FSK modulation scheme using the frequency band only approximately half the occupied bandwidth, the QPSK modulation scheme uses almost all the frequency band of the occupied bandwidth, and, thus, if the oscillation frequency of the local oscillator has been shifted, leakage to an adjacent channel may occur during transmission.

Thus, the present invention is effective especially for the QPSK modulation scheme. In particular, the $\pi/4$ shift (hereinafter, referred to as $\pi/4D$) QPSK modulation scheme in which the phase of the QPSK modulation scheme is shifted by 45° to reduce amplitude change is more preferable because it can reduce the electric power consumed by the power amplifier.

In the radio receiver according to another aspect of the present invention, the radio receiver further includes a squelch circuit that detects a noise level; and a third correcting unit configured to stop the high-speed pull-in processing by the first correcting unit in a case where the noise level detected by the squelch circuit is larger than a predetermined threshold value. With this configuration, erroneous offset correction due to noise can be prevented.

Although the present invention has been fully described by way of example with reference to the accompanied drawings, it is to be understood that various changes and modifications will be apparent to those skilled in the art.

Therefore, unless otherwise such changes and modifications depart from the scope of the present invention hereinafter defined, they should be construed as being included therein.

What is claimed is:

1. A radio receiver using a modulation scheme in which a frequency shift from a radio transmitter appears as a DC offset in a demodulated signal, comprising:
   a synchronization word pattern detection circuit obtaining the DC offset from a difference between a direct current value of a predetermined number of symbol patterns of the demodulated signal and a known direct current value of symbol patterns of a synchronization signal;
   a first DC offset correcting circuit adjusting the value of the DC offset output from the synchronization word pattern detection circuit;
   a symbol recovery circuit that performs high-speed pull-in processing by subtracting, from the demodulated signal, the value of the DC offset adjusted by the first DC offset correcting circuit to output a corrected demodulated signal;

a second DC offset correcting circuit obtaining a residual DC offset from an average value of the corrected demodulated signal output from the symbol recovery circuit; and a local oscillator that performs low-speed pull-in processing by correcting an oscillation frequency based on the residual DC offset obtained by the second DC offset correcting circuit;

wherein, after starting the high-speed pull-in processing, the first DC offset correcting circuit reduces the DC offset output from the synchronization word pattern detection circuit, over time in each predetermined period of time.

2. The radio receiver according to claim 1, wherein a time constant of a reduction in the DC offset by the first DC offset correcting circuit is larger than a time constant of a change in the average value by the second DC offset correcting circuit.

3. The radio receiver according to claim 1, wherein the modulation scheme is a π/4 differential quadrature phase shift keying modulation scheme.

4. The radio receiver according to claim 1, further comprising:

a squelch circuit that detects a noise level; and a correction control unit configured to stop the high-speed pull-in processing by the symbol recovery circuit in a case where the noise level detected by the squelch circuit is larger than a predetermined threshold value.

5. The radio receiver according to claim 1, further comprising:

an antenna;

an orthogonal converter that orthogonally converts a signal received by the antenna; and a detection circuit that orthogonally detects an In-phase component and a Quadrature component obtained by the orthogonal converter, thereby obtaining the demodulated signal.

6. A frequency correcting method for a radio receiver using a modulation scheme in which a frequency shift from a radio transmitter appears as a DC offset in a demodulated signal, comprising:

a first offset calculating step of obtaining the DC offset from a difference between a direct current value of a predetermined number of symbol patterns of the demodulated signal and a known direct current value of symbol patterns of a synchronization signal;

an offset adjusting step of adjusting the value of the DC offset obtained in the first offset calculating step;

a first performing step of performing high-speed pull-in processing by subtracting the DC offset having the value adjusted by the offset adjusting step from the demodulated signal to output a corrected demodulated signal;

a second offset calculating step of obtaining a residual DC offset from an average value of the corrected demodulated signal obtained in the first performing step; and a second performing step of performing low-speed pull-in processing by correcting an oscillation frequency of a local oscillator with the residual DC offset obtained in the second offset calculating step;

wherein, in the offset adjusting step, the DC offset is reduced over time in each predetermined period of time.

* * * * *